US011000760B2

(12) United States Patent
Nakayama et al.

(10) Patent No.: US 11,000,760 B2
(45) Date of Patent: May 11, 2021

(54) CONTROLLER

(71) Applicant: Sony Interactive Entertainment Inc., Tokyo (JP)

(72) Inventors: Tetsunori Nakayama, Tokyo (JP); Akichika Tanaka, Kanagawa (JP); Masaki Hanzawa, Chiba (JP); Yujin Morisawa, Kanagawa (JP); Alexis Andre, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 31 days.

(21) Appl. No.: 16/472,590

(22) PCT Filed: Oct. 17, 2017

(86) PCT No.: PCT/JP2017/037443
§ 371 (c)(1),
(2) Date: Jun. 21, 2019

(87) PCT Pub. No.: WO2018/131239
PCT Pub. Date: Jul. 19, 2018

(65) Prior Publication Data
US 2019/0314721 A1    Oct. 17, 2019

(30) Foreign Application Priority Data

Jan. 11, 2017    (JP) .............................. JP2017-002534

(51) Int. Cl.
*A63F 13/24* (2014.01)
*A63F 13/235* (2014.01)
(Continued)

(52) U.S. Cl.
CPC ............ *A63F 13/24* (2014.09); *A63F 13/235* (2014.09); *G06F 3/02* (2013.01); *G06F 3/033* (2013.01)

(58) Field of Classification Search
None
See application file for complete search history.

(56) References Cited

U.S. PATENT DOCUMENTS 5,847,694 A * 12/1998 Redford ................. A63F 13/06
345/158
2006/0250358 A1   11/2006 Wroblewski
(Continued)

FOREIGN PATENT DOCUMENTS

JP        2006-285474    *  5/2008 ............. A63F 13/06
JP        2008102789 A       5/2008
(Continued)

OTHER PUBLICATIONS

International Search Report for corresponding PCT Application No. PCT/JP2017/037443, 4 pages, dated Nov. 21, 2017.
(Continued)

*Primary Examiner* — Jason T Yen
(74) *Attorney, Agent, or Firm* — Matthew B. Dernier, Esq.

(57) ABSTRACT

Proposed is a controller which can suppress an amount of protrusion of an operation member from an external surface of a chassis while operability of the operation member is maintained. A controller including a chassis, and an operation member which is slidable along an extension direction of the chassis with a predetermined position as a reference, and is rotatable in a circumferential direction of the chassis with the predetermined position as the reference, and at least a part of which is fitted into a recess section provided in an external surface of the chassis.

20 Claims, 19 Drawing Sheets

(51) Int. Cl.
*G06F 3/02* (2006.01)
*G06F 3/033* (2013.01)

(56) References Cited

U.S. PATENT DOCUMENTS

| | | |
|---|---|---|
| 2006/0267937 A1 | 11/2006 | Takatsuka |
| 2007/0120821 A1 | 5/2007 | Lee |
| 2008/0079700 A1* | 4/2008 | Everest ................ G06F 3/0362 345/184 |
| 2008/0100883 A1 | 5/2008 | Kim |
| 2010/0141609 A1* | 6/2010 | Frisbee ................ G06F 3/0362 345/184 |
| 2011/0053691 A1* | 3/2011 | Bryant ................ A63F 13/245 463/37 |
| 2011/0159958 A1* | 6/2011 | Miura ................ A63F 13/211 463/36 |
| 2016/0077582 A1 | 3/2016 | Song |
| 2017/0068332 A1* | 3/2017 | Cheng ................ G06F 3/0383 |
| 2019/0131812 A1* | 5/2019 | Lee ................ A61B 5/11 |

FOREIGN PATENT DOCUMENTS

| | | |
|---|---|---|
| JP | 2009110257 A | 5/2009 |
| JP | 2009176308 A | 8/2009 |
| JP | 2012185841 A | 9/2012 |
| JP | 2013092666 A | 5/2013 |
| JP | 2014229468 A | 12/2014 |
| WO | 2010020986 A2 | 2/2010 |

OTHER PUBLICATIONS

Partial Supplementary European Search Report for corresponding EP Application No. 17892014.6, 15 pages, dated Aug. 17, 2020.
Extended European Search Report for corresponding EP Application No. 17892014.6, 18 pages, dated Nov. 2, 2020.
Scott Lowe "Energizer induction charger for wii preview" https://www.ign.com/articles/2009/04/28/energizer-induction-charger-for-wii-preview, IGN Articles, 9 pages, Apr. 28, 2009.

* cited by examiner

FIG. 2

|  | 90a Classic type | 90b Stick type |
|---|---|---|
| 1 hand play | × | ○ |
| Free hand play | ○ | △ (unstable) |
| Easy to grasp/release | × | ○ |
| Both-handed | × | △ (Vertical holding only) |

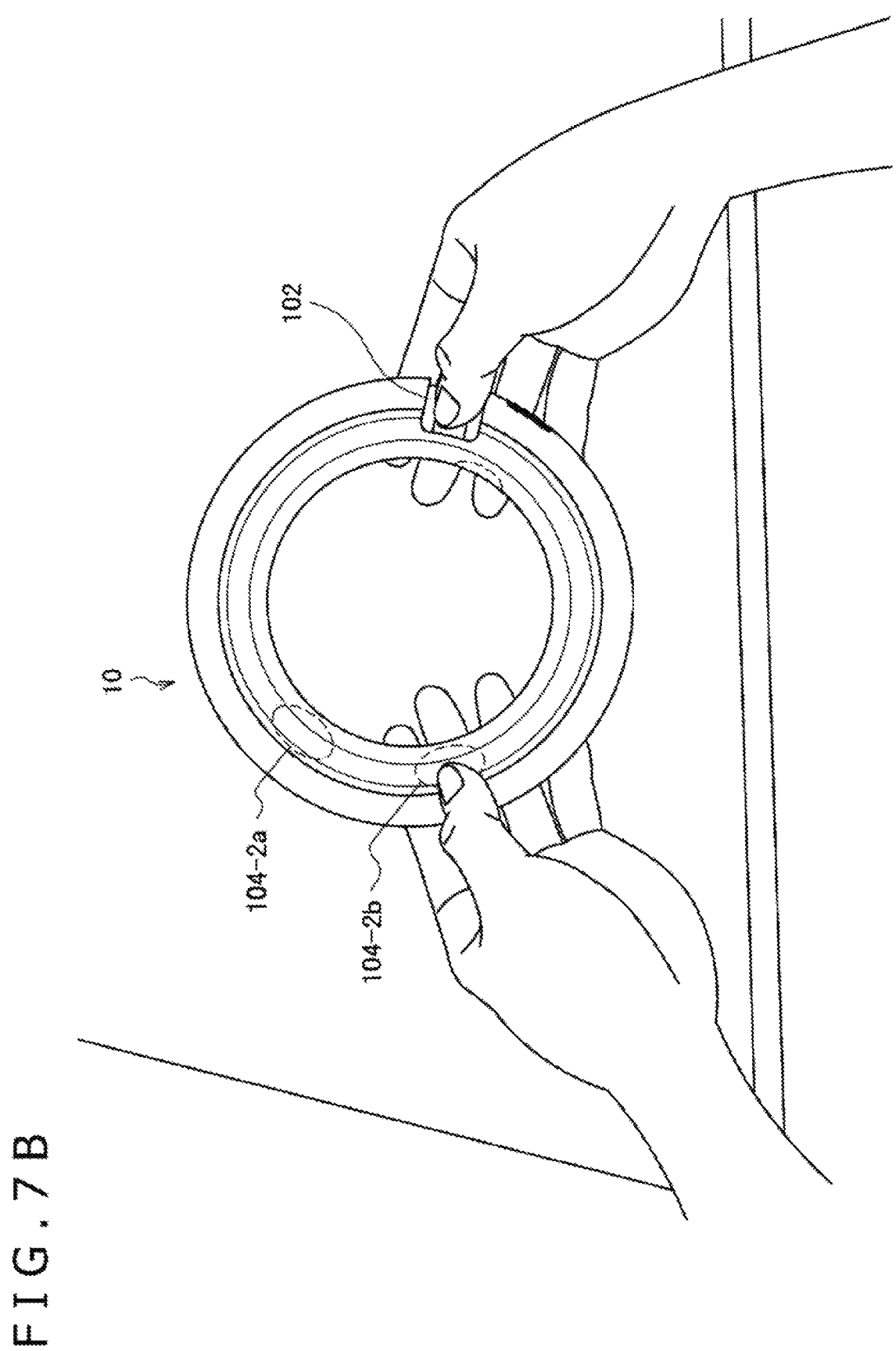

CONTROLLER

TECHNICAL FIELD

The present disclosure relates to a controller.

BACKGROUND ART

Heretofore, various kinds of controllers for manipulating operations of equipment, for example, game consoles have been developed.

For example, PTL 1 discloses a content reproducing apparatus in which an operating element capable of performing a slide operation along an axial direction of a chassis, and a rotation operation along an outer circumferential direction of the chassis is installed within the chassis.

CITATION LIST

Patent Literature

[PTL 1] Japanese Patent Laid-Open No. 2009-176308

SUMMARY

Technical Problem

However, in the content reproducing apparatus described in PTL 1, a part in which the operating element is installed in an external surface of the chassis is identical in length of the outer circumference of the chassis to a part in which no operating element is installed. For this reason, in the content representing apparatus of interest, the operating element largely protrudes from the external surface of the chassis.

Then, the present disclosure proposes a novel and improved controller which can suppress an amount of protrusion of an operation member from an external surface of a chassis while operability of the operation member is maintained.

Solution to Problem

According to the present disclosure, there is provided a controller including a chassis, and an operation member which is slidable along an extension direction of the chassis with a predetermined position as a reference, and is rotatable in a circumferential direction of the chassis with the predetermined position as the reference, and at least a part of which is fitted into a recess section provided in an external surface of the chassis.

Advantageous Effects of Invention

As has been described so far, according to the present disclosure, an amount of protrusion from the external surface of the chassis can be suppressed while the operability of the operation member is maintained. It should be noted that the effect described here is by no means necessarily limited, and any of the effects described in the present disclosure may be offered.

BRIEF DESCRIPTION OF DRAWINGS

FIG. 2 is an explanatory view depicting problems of known controllers.

FIG. 7B is a view depicting an example of a scene in which the user horizontally holds the controller 10 in such a way that the jog dial 102 is located on a right side of the user.

DESCRIPTION OF EMBODIMENTS

Hereinafter, a preferred embodiment of the present disclosure will be described in detail with reference to the accompanying drawings. It should be noted that, in the present specification and drawings, the constituent elements having substantially the same functional configuration are assigned the same reference signs and a repeated description thereof is omitted.

In addition, in the present specification and drawings, multiple constituent elements having substantially the same functional configuration are distinguished from one another by giving different alphabets subsequent to the same reference sign, in some cases. For example, multiple constituent elements having substantially the same functional configuration, if necessary, are distinguished from one other like a controller 10a and a controller 10b. It should be noted that, in a case where multiple constituent elements having substantially the same functional configuration need not to be particularly distinguished from one another, only the same reference sign is added to these constituent elements. For example, in a case where the controller 10a and the controller 10b need not to be particularly distinguished from each other, the controller 10a and the controller 10b are simply referred to as a controller 10.

In addition, the "Description of Embodiments" will now be described in accordance with the following item order.
1. Basic Configuration of Information Processing System
2. Detailed Description of Embodiment
3. Modified Examples

1. BASIC CONFIGURATION OF INFORMATION PROCESSING SYSTEM

1-1. Basic Configuration

Figure 1:
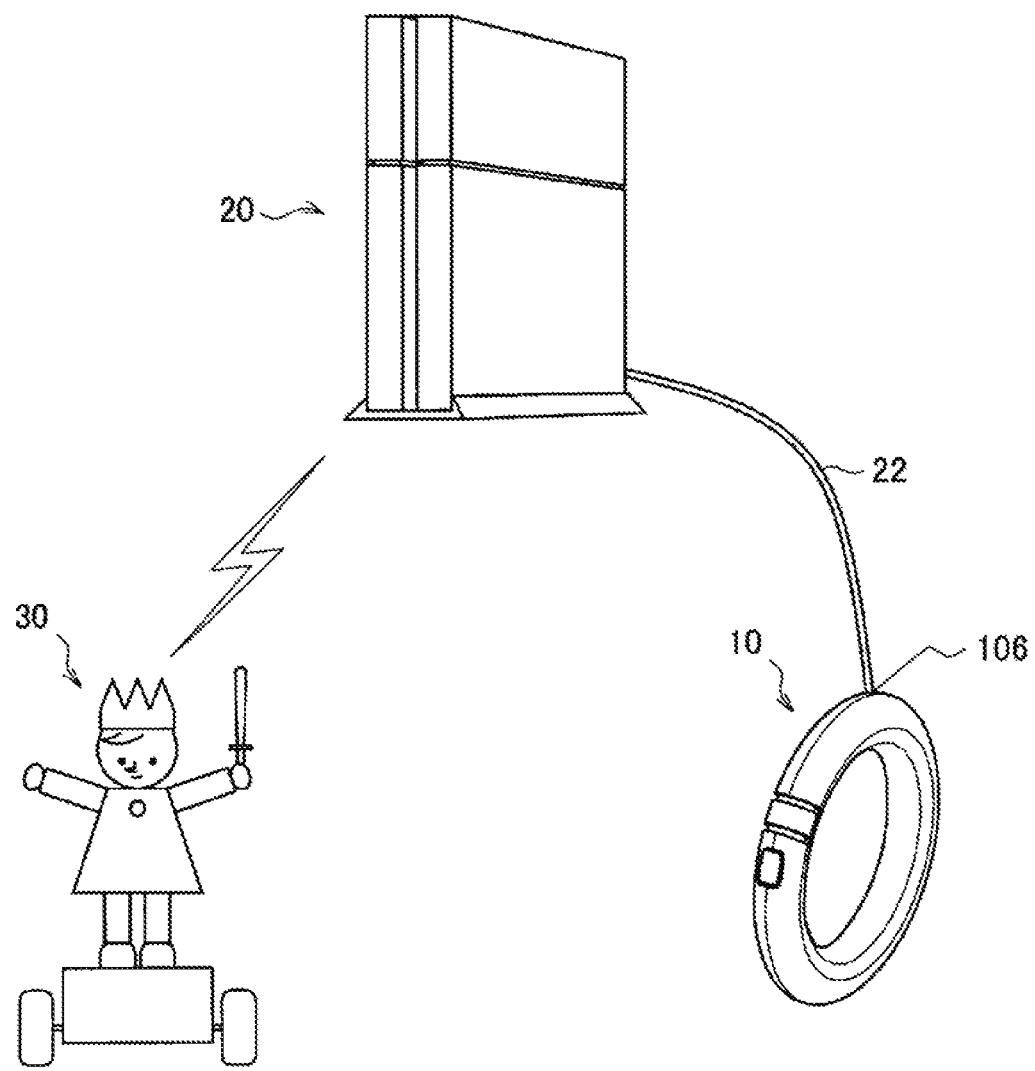
FIG. 1 is an explanatory view depicting an example of a configuration of an information processing system according to an embodiment of the present disclosure.

Firstly, a description will be given with respect to a basic configuration of an information processing system according to an embodiment of the present disclosure with reference to FIG. 1. As depicted in FIG. 1, the information processing system according to the embodiment includes a controller 10, a control apparatus 20, and an object 30.

{1-1-1. Control Apparatus 20}

The control apparatus 20 is an apparatus which controls an operation of equipment (the object 30 or the like) connected to the control apparatus 20. For example, the control apparatus 20 can be configured so as to be able to communicate with the controller 10 and the object 30 through wireless communication or wired communication. In this case, the control apparatus 20 receives an operation signal from the controller 10, and controls an operation of the object 30 on the basis of the received signal.

It should be noted that, although FIG. 1 depicts an example in which the control apparatus 20 and the controller 10 are connected to each other through a cable 22, the present disclosure is by no means limited to such an example. The cable 22 may not be provided between the control apparatus 20 and the controller 10, and the control apparatus 20 and the controller 10 may be communicated with each other through wireless communication.

In addition, the control apparatus 20, for example, can execute a predetermined application (a game application or the like) on the basis of an instruction issued from a user. Here, the predetermined application may be stored in the control apparatus 20, may be stored in an external apparatus (illustration is omitted) with which the control apparatus 20 can be communicated, or may be recorded in a predetermined recording medium from which the control apparatus 20 can read the predetermined application.

{1-1-2. Object 30}

The object 30 is equipment which executes processing responding to a control signal received from the control apparatus 20. For example, the object 30 has a drive section and moves in accordance with the control signal. Alternatively, the object 30 has a display section, a sound outputting section, or the like, and can display an image or output sound in accordance with the control signal.

{1-1-3. Controller 10}

The controller 10, for example, is an apparatus with which the user performs an operation for the object 30. For example, the controller 10 and the object 30 may be paired with each other. In this case, the user can perform an operation for the object 30 paired with the controller 10 by using the controller 10. It should be noted that a specific method for the pairing will be described later.

1-2. Arrangement of Problems

The configuration of the information processing system according to the embodiment has been described so far. Now, heretofore, various kinds of controllers for electronic equipment such as a video game console have been developed, for example. In such a controller, for example, high operability is desired, or it is desired that a user can intuitively operate such a controller. More specifically, it is desirable that the following four kinds of operating methods can be realized. First, it is desirable that a user can operate the controller only with one hand ("1 hand play"). Second, it is desirable that, in a case where, for example, the controller is placed on a floor, or the like, a user can operate the controller without gripping the controller ("free hand play"). Third, it is desirable that, for example, even a child can easily grasp or release the controller ("easy to grasp/release"). Fourth, it is desired that the operability does not change irrespective of that a user is a right-handed person or a left-handed person ("both-handed").

However, with the known controller, it is impossible or difficult to realize all the four kinds of operation methods. FIG. 2 is a diagram depicting whether or not realization of the four kinds of operation methods with respect to the known typical two kinds of controllers 90 is possible. As depicted in FIG. 2, in a "Classic type" controller 90a, of the four kinds of operation methods, only "free hand play" can be realized.

In addition, in a "Stick type" controller 90b, of the four kinds of operation methods, both "1 hand play" and "easy to grasp/release" can be realized. However, in a state in which the controller 90b, for example, is placed on the floor or the desk, since the controller 90b is not stabilized, the user is hard to operate the controller 90b. Specifically, it is difficult for the user to perform "free hand play." In addition, "both-handed" can be realized only in a case where the user holds vertically (or longitudinally) the controller 90b. For example, in a case where the user holds horizontally (or transversely) the controller 90b, a case where the operation is performed with the left hand, and a case where the operation is performed with the right hand are largely different in operability from each other.

Thus, the controller 10 according to the present embodiment has been achieved with the situation described above as one viewpoint. The controller 10 may have a ring type chassis 40. With this shape, all the four kinds of operation methods described above can be realized.

2. DETAILED DESCRIPTION OF EMBODIMENT

2-1. Configuration

{2-1-1. Exterior Appearance Configuration}
(2-1-1-1. Chassis 40)

Figure 3A:
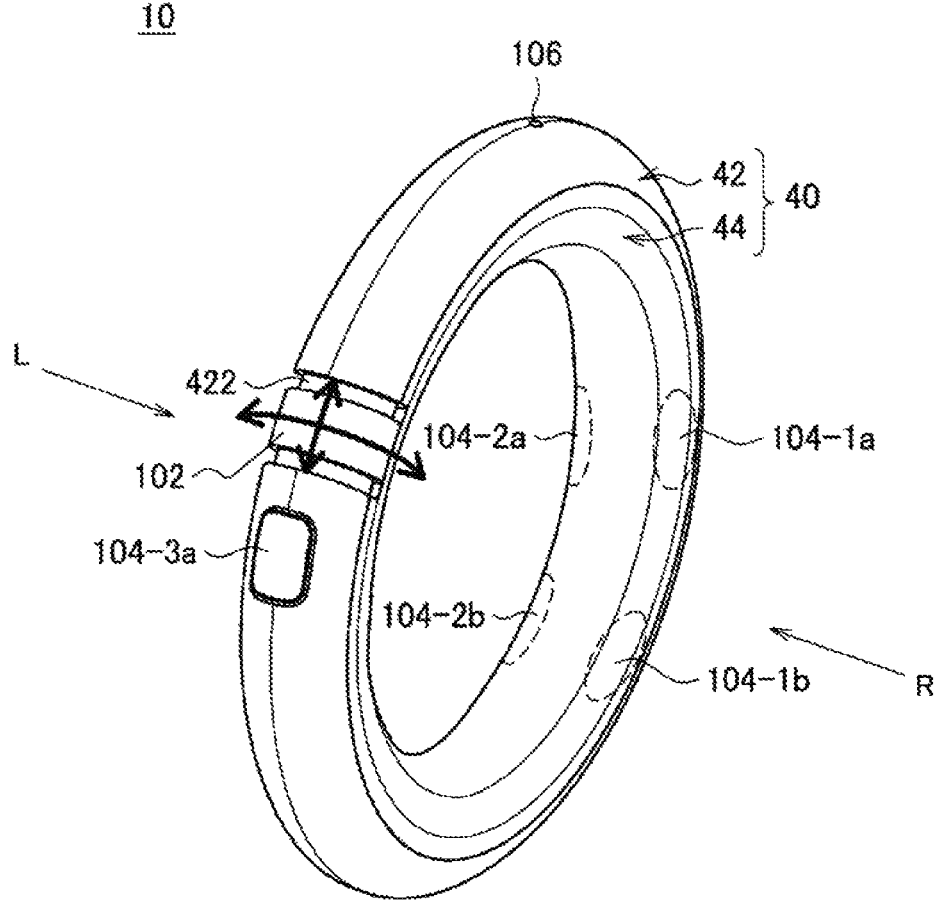
FIG. 3A is a view depicting an exterior appearance of a controller 10 according to the embodiment.
Figure 3B:
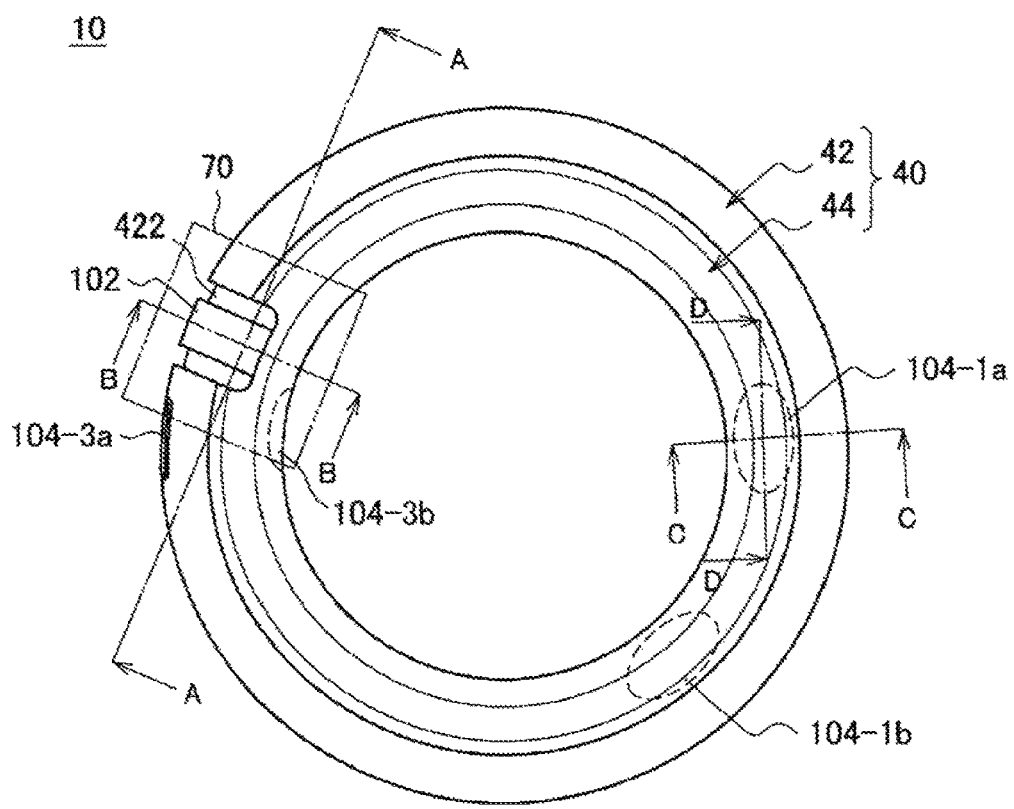
FIG. 3B is a view depicting an exterior appearance of the controller 10 when viewed from a direction of "R" depicted in FIG. 3A.
Figure 3C:
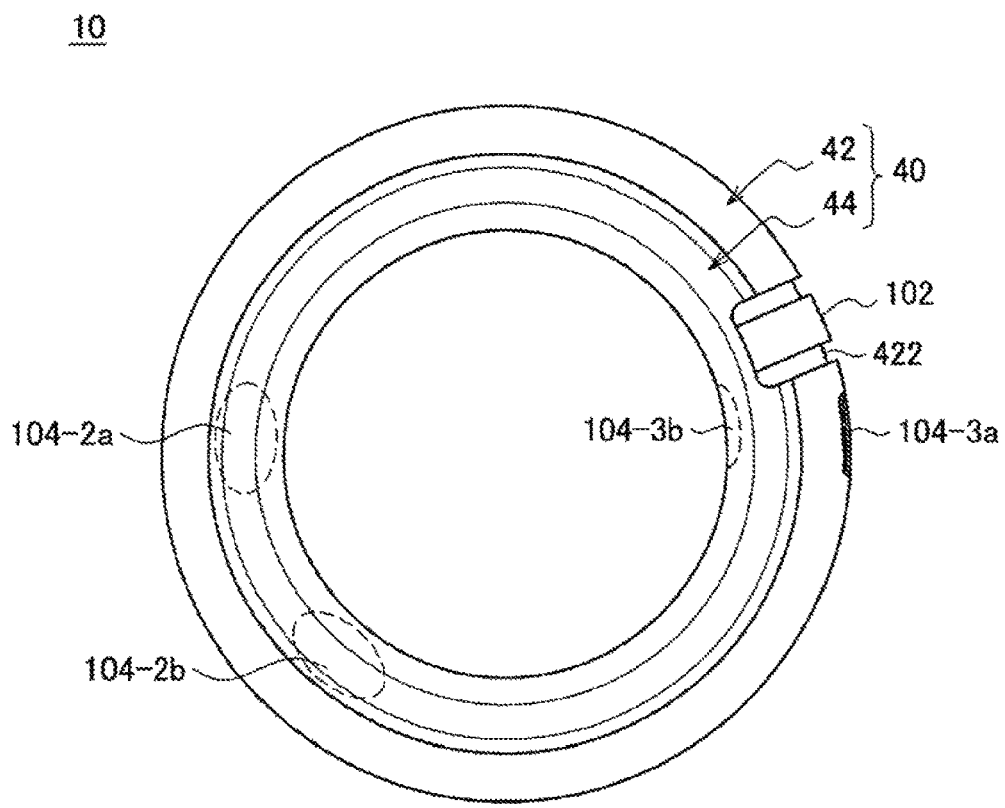
FIG. 3C is a view depicting an exterior appearance of the controller 10 when viewed from a direction of "L" depicted in FIG. 3A.

Next, a configuration of the controller 10 according to the present embodiment will be described in detail. FIG. 3A to FIG. 3C are views each depicting an exterior appearance configuration of the controller 10. As depicted in FIG. 3A, the controller 10 may have the ring type chassis 40. Here, the ring type, as depicted in FIG. 3A, may have a perfectly closed shape (in other words, a shape such that an outer circumference of the chassis 40 is entirely continuous), or may have a shape in which a part of the chassis 40 is opened (in other words, a shape such that, for example, like a "C" letter of alphabet, at least a part of the outer circumference of the chassis 40 is discontinuous). In addition, in the ring type shape, the outer circumference and/or the inner circumference of the chassis 40 may have a circle, an ellipse or a polygon (such as a quadrangle or a triangle). For example, as depicted in FIG. 3A, the ring type shape may be a doughnut type in shape (torus type shape). It should be noted that, in the following, a description will be given with a focus on an example in which the chassis 40 has the doughnut type in shape.

Figure 5:
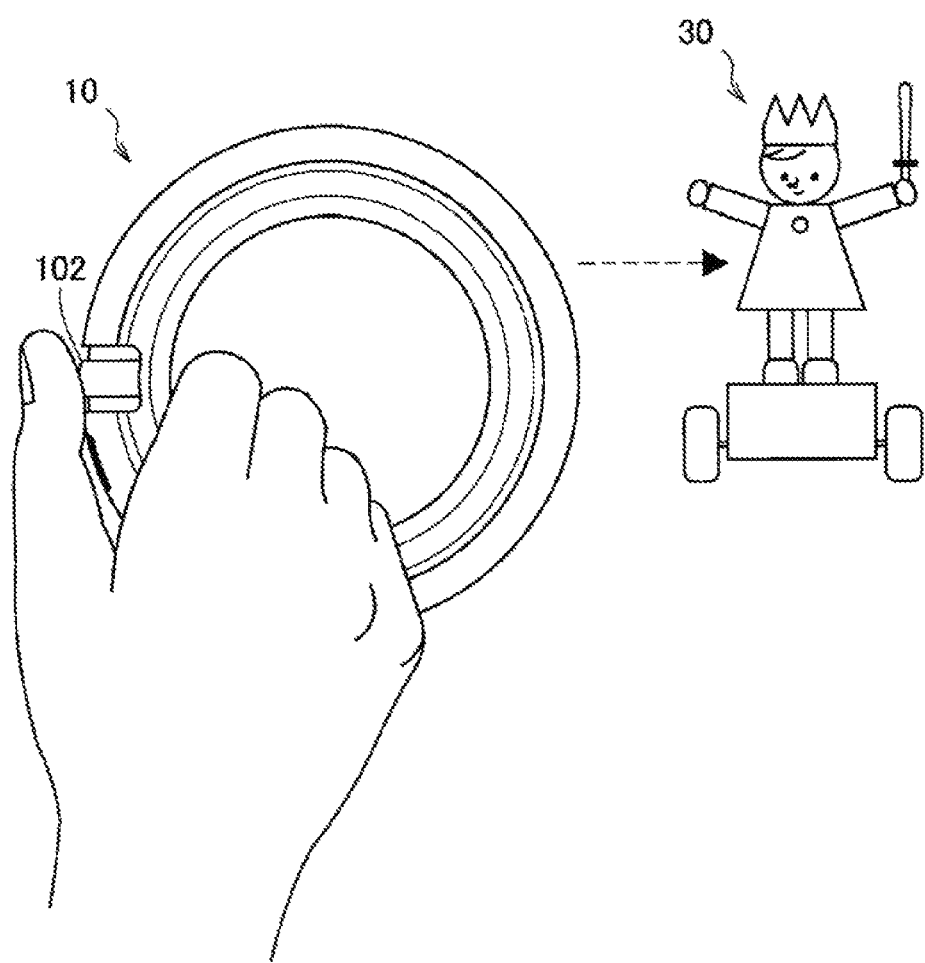
FIG. 5 is a view depicting an example of a scene in which an operation is performed with the controller 10 held in one hand.

It should be noted that a length which is a half the circumference in the circumferential direction of the chassis 40 (a direction along the circumference of a small circle of the chassis 40 in a case where the chassis 40 has the doughnut type in shape) may be equal to or smaller than a length of a hand of the user (in a word, a length equal to or the smaller than a length at which the user can grasp with one hand). As a result, as depicted in FIG. 5, the user can grasp the controller 10 with only one hand and can operate the controller 10. In a word, "1 hand play" can be realized. Incidentally, FIG. 5 is a view depicting an example of a scene in which an operation for the object 30 is performed by using the controller 10. In addition, while the user operates the controller 10 with one hand, the user, for example, can touch or move another object (such as other toy) with the other hand.

In addition, as depicted in FIG. 3B and FIG. 3C, an external surface of the chassis 40 may include a resin surface 42 arranged on the outer circumference side of the chassis 40, and a rubber surface 44 arranged on the inner circumference side of the chassis 40. Here, the resin surface 42 is an example of a first surface in the present disclosure. In addition, the rubber surface 44 is an example of a second surface in the present disclosure. The resin surface 42 may include a material (such as an acrylonitrile butadiene styrene (ABS) resin) harder than a rubber. In addition, the rubber surface 44, for example, may include a rubber such as a silicon rubber. It should be noted that, as will be described later with reference to FIG. 12, a fixed snap 444 included in the rubber surface 44 is fixed to the resin surface 42, thereby enabling the rubber surface 44 to be fixed to the resin surface 42.

Figure 6A:
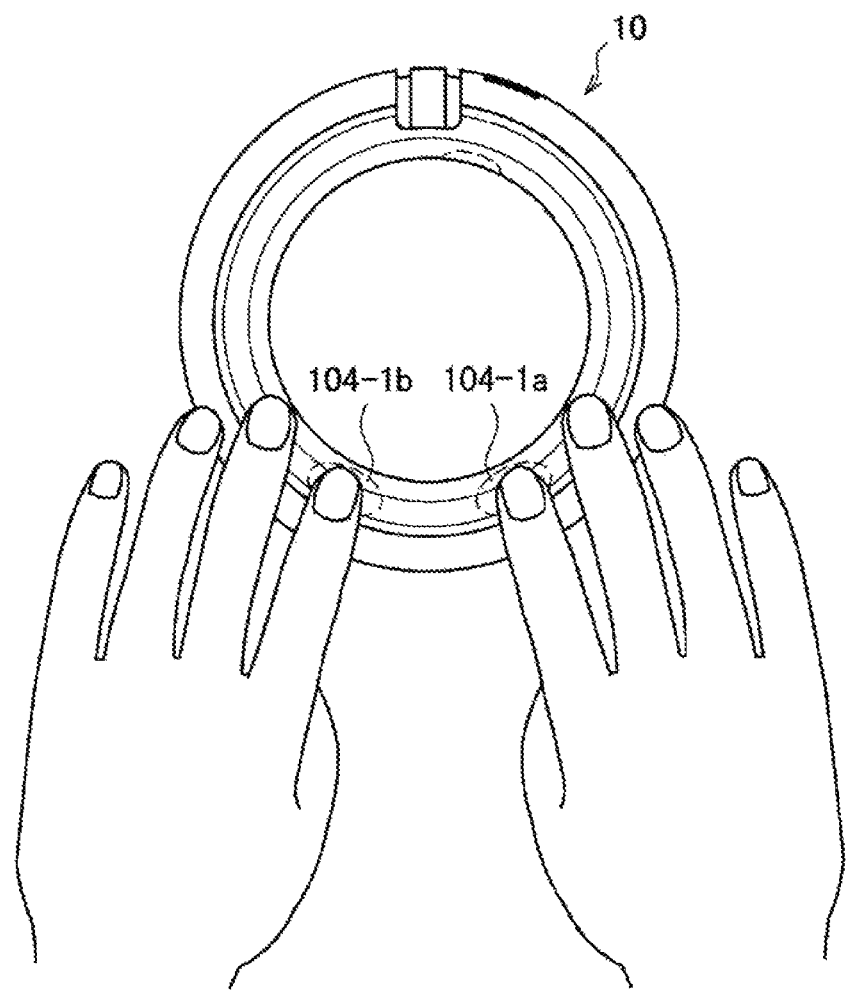
FIG. 6A depicts an example of a scene in which the controller 10 is operated in a state in which the controller 10 is placed on a desk.

In addition, in a case where the controller 10 is placed on a surface of other object, the resin surface 42 and the rubber surface 44 may be arranged in the chassis 40 in a relation such that the rubber surface 44 contacts the surface of other object. As a result, in the case where the controller 10 is placed on the surface of other object, since the rubber surface 44 having a large coefficient of friction contacts the surface of other object, while the user operates the controller 10, the controller 10 is hard to slide, so that the controller 10 is stabilized. Therefore, for example, as depicted in FIG. 6A, in a state in which the controller 10 is placed on the floor or the like, the user can easily operate the controller 10. In other words, "free hand play" can be realized. Incidentally, FIG. 6A depicts an example of a scene in which, in a state in which the controller 10 is placed on the desk, the user depresses the rubber surface 44, whereby the user depresses two interior operation buttons 104-1, which will be described later, located inside the chassis 40.

Figure 6B:
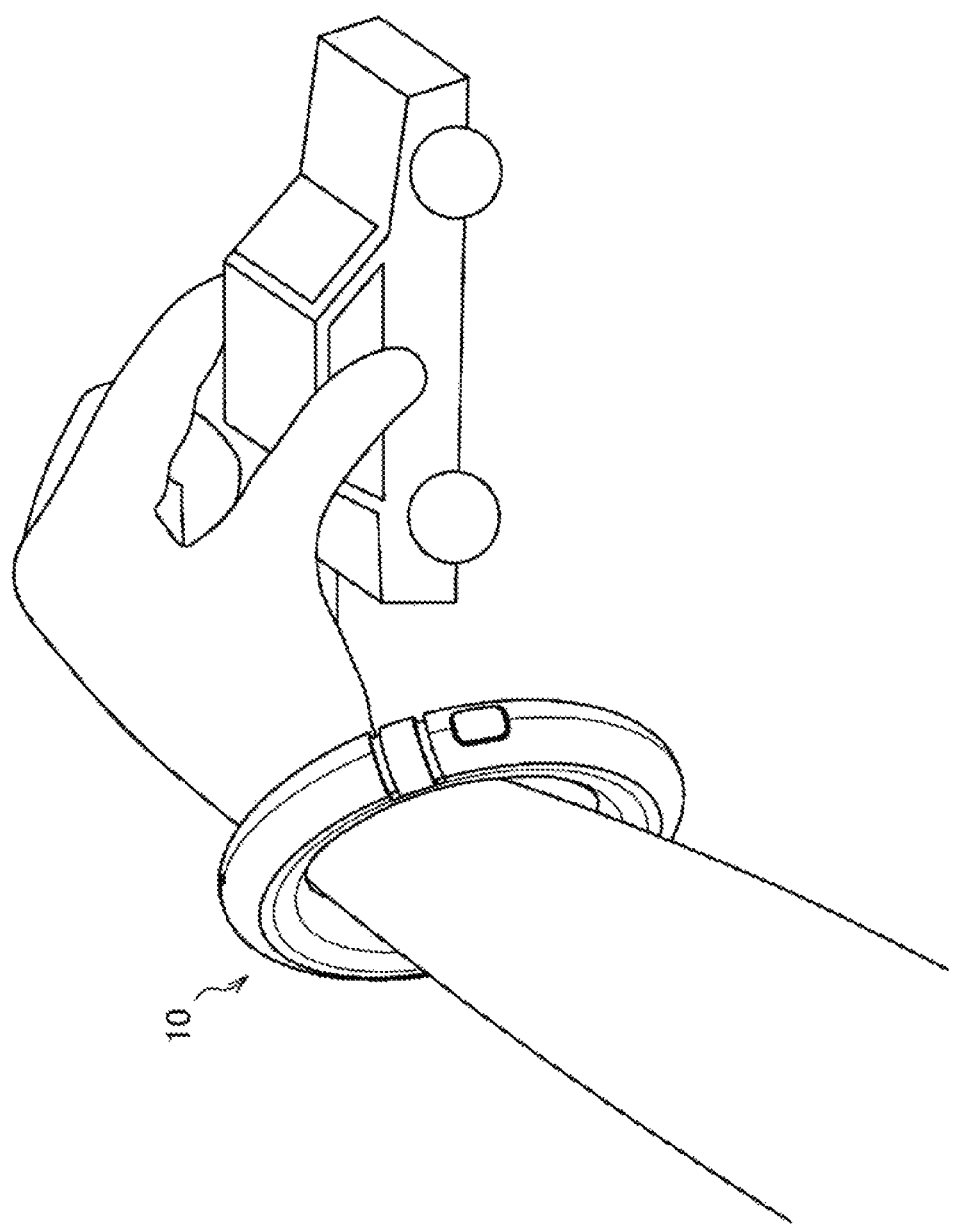
FIG. 6B depicts an example of a scene in which a user passes his/her arm through an opening at a center of the controller 10 to touch other object.

In addition, since the controller 10 has the ring type in shape, for example, as depicted in FIG. 6B, the user may be able to pass his/her arm through an opening at the center of the controller 10. In this case, for example, during the play of the game application, the user can touch or move other object (such as other toy) without placing the controller 10 on the floor.

It should be noted that, as depicted in FIG. 3A, a cable connection sensor 106 to which the cable 22 can be connected may be disposed at a predetermined position of the resin surface 42. As described above, the cable 22 is connected to the cable connection sensor 106, thereby enabling the controller 10 to communicate with the control apparatus 20. In addition, the controller 10 can also communicate with the control apparatus 20 in a wireless manner without connecting the control apparatus 20 and the controller 10 to each other through the cable 22.

(2-1-1-2. Jog Dial 102)

In addition, as depicted in FIG. 3A, a jog dial 102 may be disposed on the external surface of the chassis 40. For example, as depicted in FIG. 3A, the jog dial 102 may be disposed on the external surface of the chassis 40 in such a way that at least a part of the jog dial 102 is fitted into a recess section 422 provided at a predetermined position of the resin surface 42. Here, the jog dial 102 is an example of an operation member in the present disclosure.

In addition, as indicated with two arrows perpendicular to each other in FIG. 3A, the jog dial 102 is slidable along an extension direction of the chassis 40 with a predetermined position in the recess section 422 as a reference, and is rotatable in the circumferential direction of the chassis 40 with the predetermined position as the reference. Here, in a case where the chassis 40 has the doughnut type in shape, the extension direction is a direction along the circumference of a large circle of the chassis 40, and the circumference direction is a direction along the circumference of a small circle of the chassis 40.

In addition, although details will be described later, the controller 10 may further have an elastic member 600 which is constructed in such a way that an elastic force directed toward the predetermined position is given to the jog dial 102 in a case where the jog dial 102 moves from the predetermined position. As a result, even in a case where the user slides the jog dial 102 in any of the extension directions of the chassis 40, for example, when the user releases his/her hand from the jog dial 102, the jog dial 102 may automatically return to the predetermined position. In addition, even in a case where the user rotates the jog dial 102 in any of the circumferential directions of the chassis 40, for example, when the user releases his/her hand from the jog dial 102, the jog dial 102 may automatically return to the predetermined position.

Figure 7A:
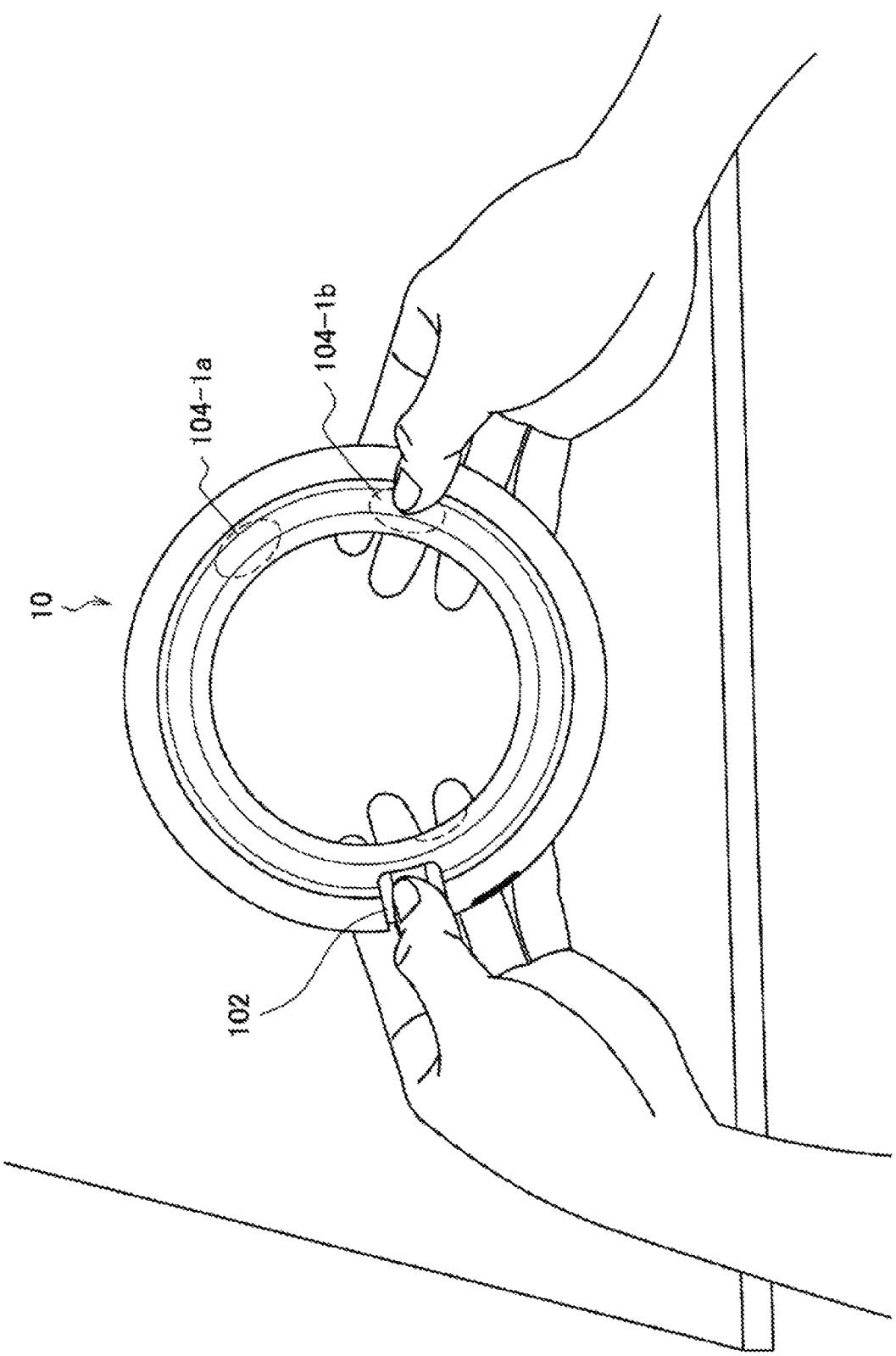
FIG. 7A is a view depicting an example of a scene in which the user horizontally holds the controller 10 in such a way that the jog dial 102 is located on a left side of the user.

In addition, FIG. 3B is a view depicting an exterior appearance of the controller 10 when viewed from a direction of an arrow "R" depicted in FIG. 3A. In addition, FIG. 3C is a view depicting an exterior appearance of the controller 10 when viewed from a direction of an arrow "L" (specifically, a direction opposite to the direction of the arrow "R") depicted in FIG. 3A. As depicted in FIG. 3B and FIG. 3C, the resin surface 42 and the rubber surface 44 may have substantially symmetrical shapes with a predetermined surface within the chassis 40 as a reference. Here, the predetermined surface may be surface which is parallel to the extension direction of the chassis 40, and passes through the center of a cross section of the chassis 40 along the circumferential direction of the chassis 40. In addition, the external surface of the jog dial 102 can also have substantially symmetrical shape with the predetermined surface as the reference. As a result, for example, in the case where the user horizontally holds the controller 10 (specifically, in a case where the user holds the controller 10 in such a way that the opening at the center of the controller 10 is caused to face the user), a case (as depicted in FIG. 7A) where the jog dial 102 is located on the left side of the user, and a case (as depicted in FIG. 7B) where the jog dial 102 is located on the right side of the user are substantially identical to each other in shape and area of a portion directed to the user side of the jog dial 102. Therefore, it is possible to expect that the operability does not change between the case where the jog dial 102 is operated with the right hand and the case where the jog dial 102 is operated with the left hand. In other words, "both-handed" can be realized.

Figure 4:
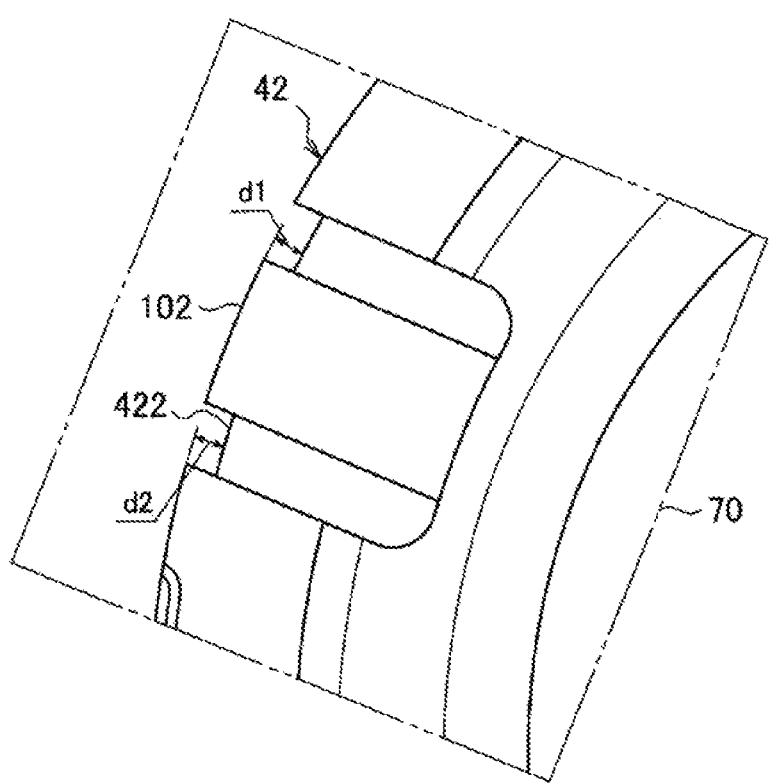
FIG. 4 is an enlarged view of a circumferential portion 70 of a jog dial 102 depicted in FIG. 3B.

In addition, FIG. 4 is an enlarged view of a circumferential portion 70 of the jog dial 102 depicted in FIG. 3B. As depicted in FIG. 4, an amount of protrusion of the jog dial 102 from the recess section 422 (for example, a distance d1 depicted in FIG. 4) may be substantially identical to a depth of the recess section 422 from the resin surface 42 (for example, a distance d2 depicted in FIG. 4). As a result, the surface of the chassis 40 and the external surface of the jog dial 102 give the exterior appearance as if they are continuous, and a design is configured such that the controller 10 forms a circle (doughnut type) in shape as a whole. Therefore, the exterior appearance of the entire controller 10 becomes excellent. It should be noted that the detailed configuration of the jog dial 102 will be described later.

(2-1-1-3. External Operation Button 104-3)

In addition, as depicted in FIG. 3B and FIG. 3C, an exterior operation button 104-3 may be disposed on the external surface of the chassis 40. For example, as depicted in FIG. 3B and FIG. 3C, an exterior operation button 104-3*a* may be disposed on the outer circumferential side of the chassis 40 (specifically, on the resin surface 42 side), and an exterior operation button 104-3*b* may be disposed on the inner circumferential side of the chassis 40 (specifically, on the rubber surface 44 side).

Here, the exterior operation button 104-3*a* can be fitted into an opening (illustration is omitted) provided in the resin surface 42 to be disposed in the chassis 40. For example, the exterior operation button 104-3*a* is fitted into the opening in such a way that a height of an external surface of the exterior operation button 104-3*a* becomes substantially identical to a height of the resin surface 42.

It should be noted that the number of exterior operation buttons 104-3*a* and the number of exterior operation buttons 104-3*b* are not particularly limited. For example, a plurality of exterior operation buttons 104-3*a* or exterior operation buttons 104-3*b* may be disposed, or none of the exterior operation buttons 104-3*a* nor the exterior operation buttons 104-3*b* may be disposed. In addition, the installation positions of the exterior operation button 104-3*a* and exterior operation button 104-3*b* are also not particularly limited. For example, the exterior operation button 104-3*b* may be disposed at a position on the rubber surface 44 side on the circumference of the chassis 40 corresponding to the position of the jog dial 102.

(2-1-1-4. Interior Operation Button 104-1, Interior Operation Button 104-2) In addition, as depicted by one-dot chain lines in FIG. 3A to FIG. 3C, an interior operation button 104-1 and an interior operation button 104-2 may be disposed inside the chassis 40. For example, two or more interior operation buttons 104-1 and two or more interior operation buttons 104-2 may be disposed. Here, the number of interior operation buttons 104-1 and the number of interior operation buttons 104-2 may be identical to each other. In this case, each of a plurality of interior operation buttons 104-1, and any one of a plurality of interior operation buttons 104-2 may be disposed so as to correspond to each other on a one-to-one basis. In addition, each of the interior operation button 104-1 of interest and the interior operation button 104-2 corresponding to the interior operation button 104-1 of interest may be associated with the same function. Here, the interior operation button 104-1 is an example of a first operation button in the present disclosure, and the interior operation button 104-2 is an example of a second operation button in the present disclosure.

In addition, the individual interior operation buttons 104-1, and the individual interior operation buttons 104-2 receive operation on the basis of depressing of the rubber surface 44. In addition, as depicted in FIG. 3B and FIG. 3C, the individual interior operation buttons 104-1, and the individual interior operation buttons 104-2 may be basically disposed in internal regions of the chassis 40 corresponding to the rubber surface 44. As described above, since the rubber surface 44 is made of rubber, the user depresses the rubber surface 44, thereby enabling the individual interior operation buttons 104-1, and the individual interior operation buttons 104-2 to be easily depressed.

In addition, each of the plurality of interior operation buttons 104-1 may be disposed at the position substantially symmetrical to the interior operation button 104-2 corresponding to the interior operation button 104-1 of interest with the predetermined surface described above as the reference (specifically, the surface which is parallel to the extension direction of the chassis 40 and passes through the center of the cross section of the chassis 40 along the circumferential direction of the chassis 40). As a result, for example, in a case where the user horizontally holds the controller 10, the positions of the individual interior operation buttons 104-1 in the case (as depicted in FIG. 7A) the jog dial 102 is located on the left side of the user, and the positions of the individual interior operation buttons 104-2 in the case (as depicted in FIG. 7B) the jog dial 102 is located on the right side of the user are substantially identical to each other. Therefore, it is possible to expect that the operability does not change between the case where the individual interior operation buttons 104-1 are operated with one hand (for example, with the right hand), and the case where the individual interior operation buttons 104-2 are operated with the other hand (for example, with the left hand) (in other words, "both-handed" can be realized).

It should be noted that, although the interior operation buttons 104-1 and the interior operation buttons 104-2 are as a general rule disposed by the same number, the specific number is by no means particularly limited. In addition, the installation positions, along the extension direction of the chassis 10, of the interior operation buttons 104-1 and the interior operation buttons 104-2 are also by no means particularly limited. For example, in the case where as depicted in FIG. 3B and FIG. 3C, the interior operation buttons 104-1 and the interior operation buttons 104-2 are disposed two by two, the interior operation buttons 104-1*b* may be disposed at the positions substantially symmetrical to the interior operation buttons 104-1*a* with the cross section along the circumference of the chassis 40 (for example, a cross section of the chassis 40 taken along line B-B depicted in FIG. 3B) at the position of the center of the external surface of the jog dial 102 as a reference. It should be noted that this also applies to the interior operation buttons 104-2.

It should be noted that detailed configuration of the interior operation button 104-1 and the interior operation button 104-2 will be described later.

(2-1-1-5. Light Emitting Section 126)

In addition, a light emitting section 126 may be further disposed on the external surface of the chassis 40. The light emitting section 126, for example, may include a full-color light emitting diode (LED), or may include a liquid crystal display (LCD), an organic light emitting diode (OLED), or the like.

Figure 8A:
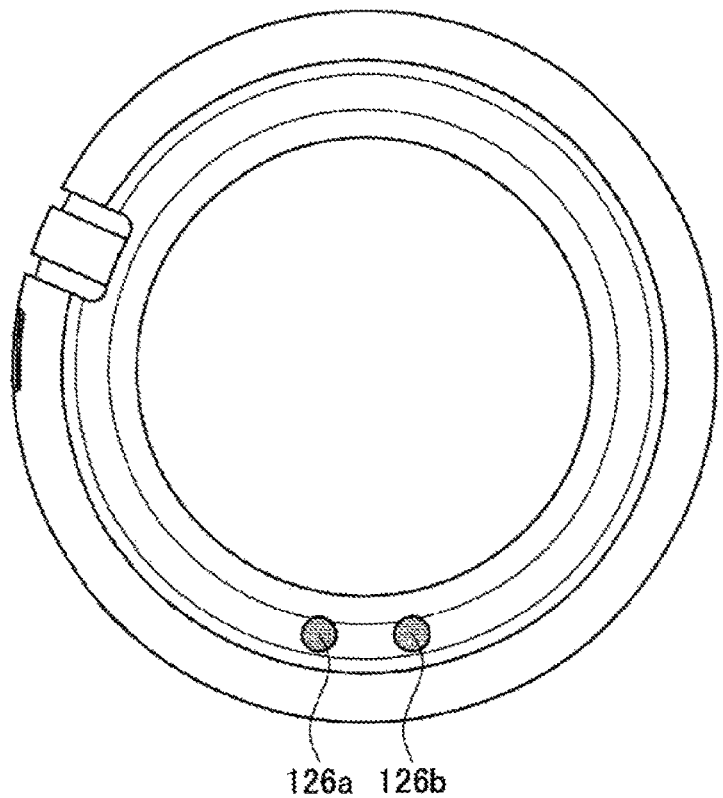
FIG. 8A is a view depicting an example in which a light emitting section 126 is disposed at a predetermined position on an external surface of a chassis 40.
Figure 8B:
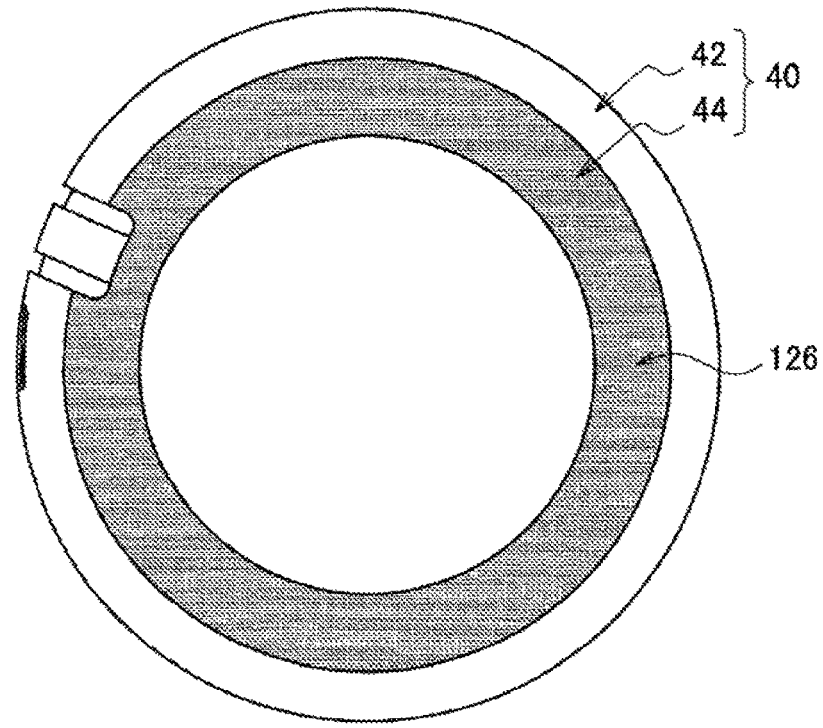
FIG. 8B is a view depicting an example in which the light emitting section 126 is disposed substantially on an entire rubber surface 44.

For example, as depicted in FIG. 8A, at least one light emitting section 126 may be disposed at a predetermined position on the external surface of the chassis 40. Alternatively, as depicted in FIG. 8B, the light emitting section 126 may be disposed substantially over the entire rubber surface 44 in such a way that, for example, the light emission becomes possible substantially over the entire rubber surface 44.

With such a configuration, when, for example, various events are generated in the game application being activated, it becomes possible to cause the light emitting section 126 to emit light in a predetermined light emission pattern. Therefore, generation of the event can be expressed on the controller 10.

{2-1-2. Internal Configuration of Chassis 40}

The external configuration of the controller 10 according to the present embodiment has been described so far. Next, an internal configuration of the chassis 40 will be described in detail. In this case, a description is given with a focus on the configurations of the jog dial 102, the interior operation button 104-1, and the interior operation button 104-2.

(2-1-2-1. Jog Dial 102)

Figure 9:
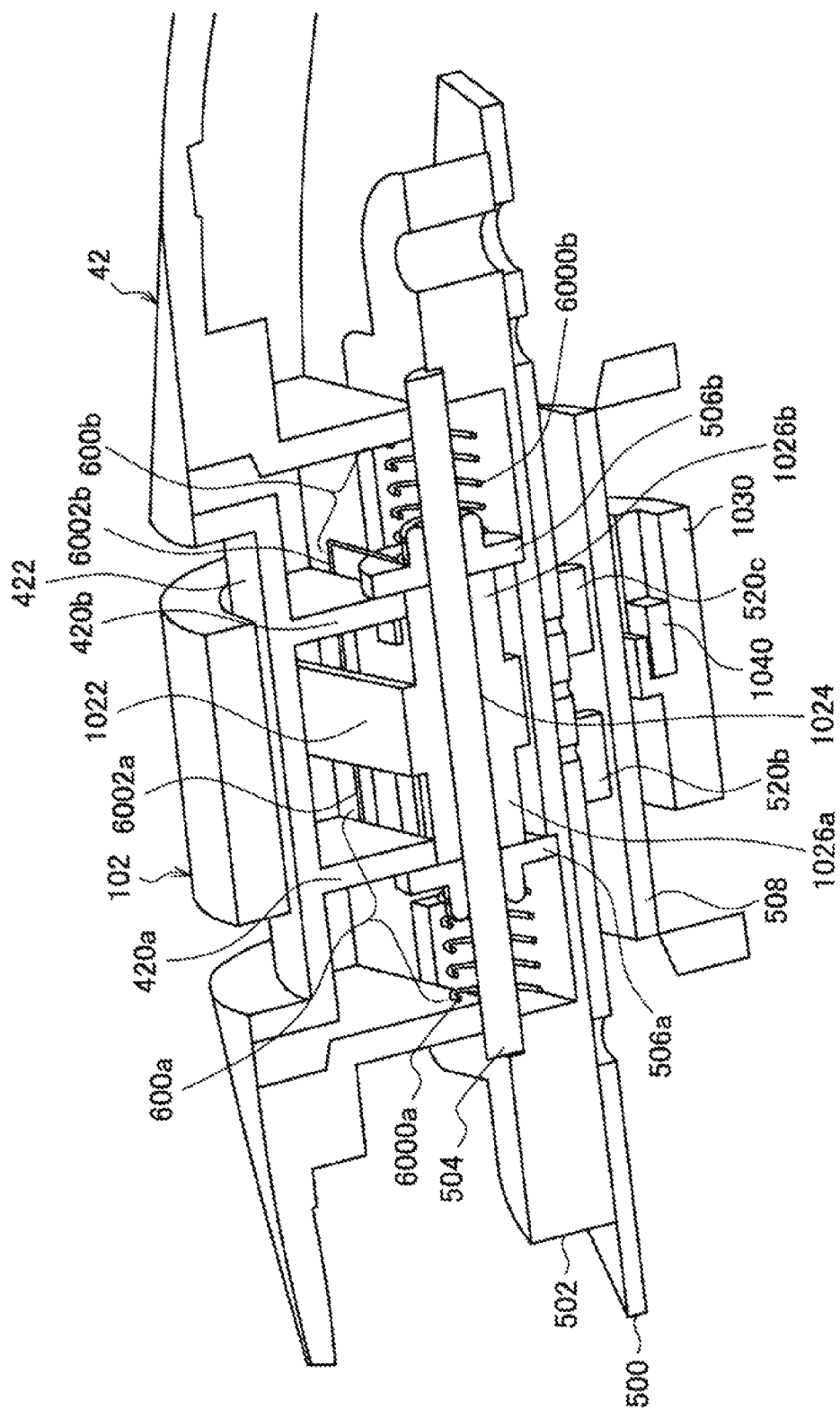
FIG. 9 is a view schematically depicting a cross section of the chassis 40 taken along line A-A depicted in FIG. 3B.
Figure 10:
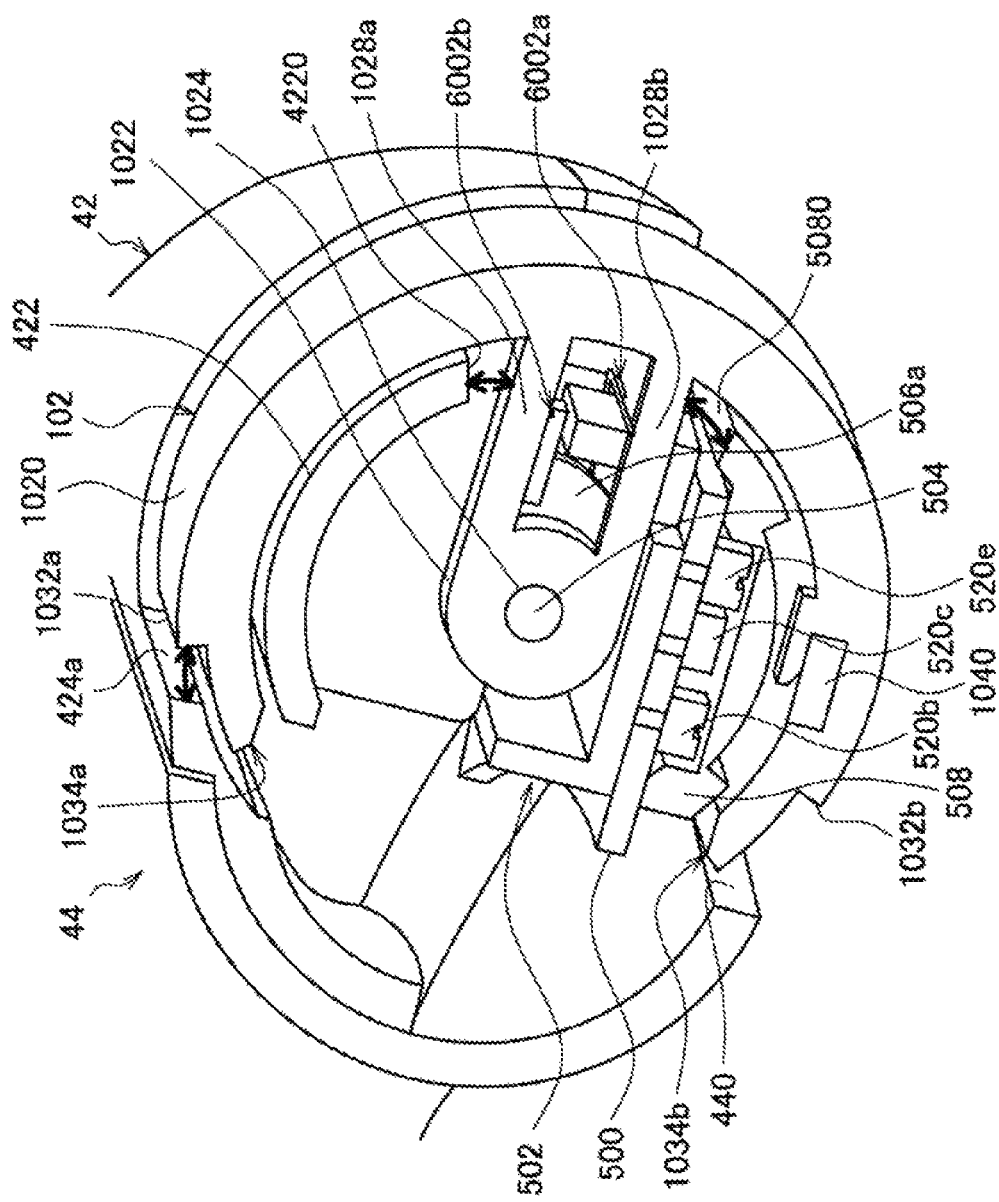
FIG. 10 is a view schematically depicting a cross section of the chassis 40 taken along line B-B depicted in FIG. 3B.

Firstly, the configuration of the jog dial 102 will be described with reference to FIG. 9 and FIG. 10. FIG. 9 is a view schematically depicting a cross section of the chassis 40 taken along line A-A depicted in FIG. 3B. In addition, FIG. 10 is a view schematically depicting a cross section of the chassis 40 taken along line B-B depicted in FIG. 3B.

As depicted in FIG. 9, for example, a substrate 500 may be arranged along the extension direction of the chassis 40 inside the chassis 40. Then, a shaft fixing section 502 may be fixed on a side of one direction (in an upper direction depicted in FIG. 9, for example) perpendicular to the extension direction. In addition, a support shaft 504, a dial ring 1022 (included in the jog dial 102), two slide stoppers 506, and two elastic members 600 may be fixed to the one direction side of the shaft fixing section 502.

Elastic Member 600

Here, as described above, in the case where the jog dial 102 is moved from the predetermined position, the elastic member 600 may be configured so as to give an elastic force directed toward the predetermined position to the jog dial 102. More specifically, the elastic member 600 may include a compression spring 6000 configured so as to be elastically deformed in the extension direction of the chassis 40, and an elastic structure 6002 configured so as to be elastically deformed in the circumferential direction of the chassis 40. For example, the elastic member 600 is an integrally molded spring including the compression spring 6000 and the elastic structure 6002. However, the present disclosure is by no means limited to such an example, and the compression spring 6000 and the elastic structure 6002 may be discrete components. Here, the compression spring 6000 is an example of a first elastic structure in the present disclosure, and the elastic structure 6002 is an example of a second elastic structure in the present disclosure.

Compression Spring 6000

For example, as depicted in FIG. 9, the compression springs 6000 included in the respective elastic members 600 may be arranged adjacent along the extension direction of the chassis 40 to any one of two slide stoppers 506, and may be fixed to the slide stopper 506. In addition, the compression spring 6000 may be fixed to the one direction side of the shaft fixing section 502.

In addition, as depicted in FIG. 9 and FIG. 10, the jog dial 102 may include a dial ring 1022, two slide sections 1026, and two connection sections 1028. In addition, the dial ring 1022 and the two slide sections 1026 each include a fitting hole 1024, and a support shaft 504 may be inserted through these fitting holes 1024. In addition, end portions of the two slide sections 1026 can be fixed to the slide stoppers 506 adjacent to the end portions, respectively.

With such a configuration, when the user slides the jog dial 102 in a third direction (in a left direction depicted in FIG. 9, for example) in the extension direction of the chassis 40, a force of the slide is transmitted to the slide stopper 506a located in the third direction. As a result, the slide stopper 506a slides in the third direction to compress the compression spring 6000a located in the third direction. Then, for example, when the user releases his/her hand from the jog dial 102, the compression spring 6000a gives an elastic force directed toward a fourth direction (a right direction depicted in FIG. 9, for example) opposite to the third direction to the slide stopper 506a, so that the slide stopper 506a moves until it contacts a stopper rib 420a. In addition, the slide section 1026a (of the jog dial 102) fixed to the slide stopper 506a moves in the fourth direction in response to the movement of the slide stopper 506a, so that the jog dial 102 may return to an initial position.

Elastic Structure 6002

In addition, the elastic structure 6002 may include a first torsion spring 6002a, and a second torsion spring 6002b. In this case, the first torsion spring 6002a gives an elastic force directed toward the first direction (a downward direction depicted in FIG. 10, for example) in the circumferential direction of the chassis 40 to the jog dial 102. The second torsion spring 6002b gives an elastic force directed toward a second direction (an upward direction depicted in FIG. 10, for example) opposite to the first direction in the circumferential direction to the jog dial 102. Alternatively, the elastic structure 6002 may include one of the first torsion spring 6002a or the second torsion spring 6002b. In this case, for example, the elastic member 600a may include the compression spring 6000a and the first torsion spring 6002a, and the elastic member 600b may include the compression spring 6000b and the second torsion spring 6002b. Here, the first torsion spring 6002a is an example of a first elastic member in the present disclosure, and the second torsion spring 6002b is an example of a second elastic member in the present disclosure.

In addition, as depicted in FIG. 10, the first torsion spring 6002a may be disposed so as to contact the connection section 1028b included in the jog dial 102. In addition, the second torsion spring 6002b may be disposed so as to contact the connection section 1028a included in the jog dial 102.

With such a configuration, when the user rotates the jog dial 102 in the second direction (in the upward direction depicted in FIG. 10, for example) in the circumferential direction of the chassis 40, a force of the rotation is transmitted to the first torsion spring 6002a through the connection section 1028b. As a result, the first torsion spring 6002a is deformed in response to the amount of rotation.

Thereafter, for example, when the user releases his/her hand from the jog dial 102, the first torsion spring 6002*a* is elastically deformed, and gives the elastic force responding to the amount of rotation of the jog dial 102 when the user releases his/her hand from the jog dial 102, to the jog dial 102 (more accurately, the connection section 1028*b*). As a result, the jog dial 102, for example, may rotate until the connection section 1028*a* contacts the second torsion spring 6002*b*, thereby returning to an initial position.

It should be noted that the rotatable range of the jog dial 102 may be limited. For example, the jog dial 102 may be rotatable in the second direction either until the connection section 1028*a* included in the jog dial 102 contacts an end portion 4220 of the recess section 422, or until a first end portion 1032*a* included in the jog dial 102 contacts a cut-out portion 424*a* of the chassis 40. In other words, either the end portion 4220 or the cut-out portion 424*a* may play a role of a stopper against the rotation of the jog dial 102 in the second direction. It should be noted that no object is arranged on a rotation orbit of the second end portion 1034*a* included in the jog dial 102 (depicted in FIG. 10). For this reason, even when the jog dial 102 rotates, the second end portion 1034*a* does not contact other object.

Likewise, the jog dial 102 is rotatable in the first direction either until the connection section 1028*b* included in the jog dial 102 contacts an end portion 5080 of an element supporting section 508 which will be described later, or until the first end portion 1032*b* included in the jog dial 102 contacts the cut-out portion 424*b* (illustration is omitted) of the chassis 40. In other words, either the end portion 5080 or the cut-out portion 424*b* may play a role of a stopper against the rotation of the jog dial 102 in the first direction.

Hall Element 520

In addition, as depicted in FIG. 9, the element supporting section 508 may be fixed to the side of a direction (a downward direction depicted in FIG. 9, for example) opposite to the one direction perpendicular to the extension direction of the substrate 500. Then, at least one hall element 520 may be fixed so as to be held between the substrate 500 and the element supporting section 508. Here, the hall element 520 is an example of a second sensor in the present disclosure. The hall element 520 functions as a magnetic sensor.

The at least one hall element 520 can sense an amount of sliding of the jog dial 102 along the extension direction of the chassis 40, and an amount of rotation of the jog dial 102 in the circumferential direction of the chassis 40. For example, as depicted in FIG. 9, the jog dial 102 may have a magnet 1040 on the side of the direction (the downward direction depicted in FIG. 9, for example) opposite to the one direction. In this case, the hall element 520 senses a change in density of magnetic flux of its surroundings accompanying a change in position of the magnet 1040, thereby being able to sense the amount of sliding of the jog dial 102 and the amount of rotation of the jog dial 102.

(2-1-2-2. Interior Operation Button 104-1, Interior Operation Button 104-2)

Construction

Figure 11:
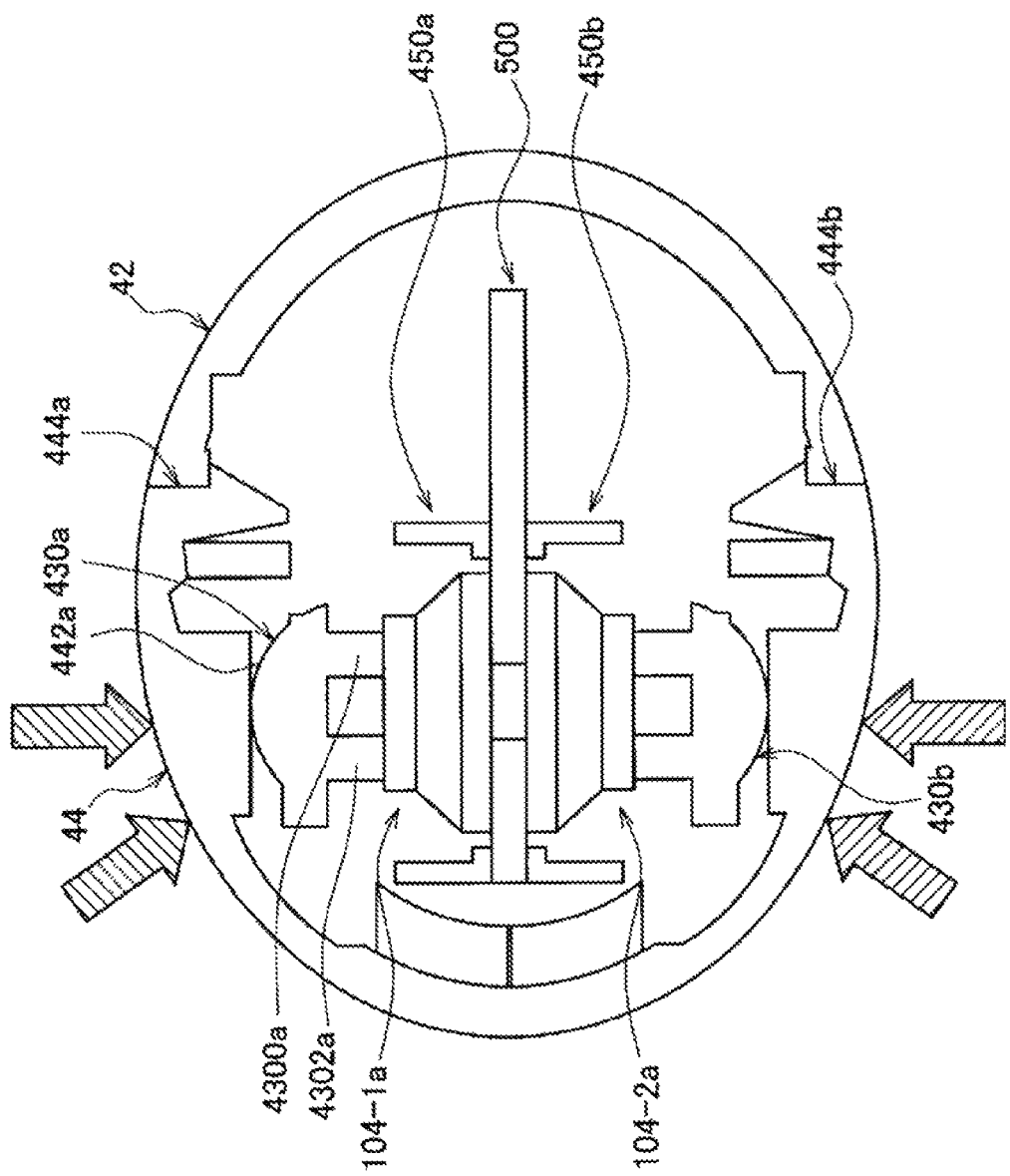
FIG. 11 is a view schematically depicting a cross section of the chassis 40 taken along line C-C depicted in FIG. 3B.

Next, constructions of the interior operation button 104-1 and the interior operation button 104-2 will be described in detail with reference to FIG. 11 and FIG. 12. FIG. 11 is a view schematically depicting a cross section of the chassis 40 taken along line C-C depicted in FIG. 3B. In addition, FIG. 12 is a view schematically depicting a cross section of the chassis 40 taken along line D-D depicted in FIG. 3B.

Figure 12:
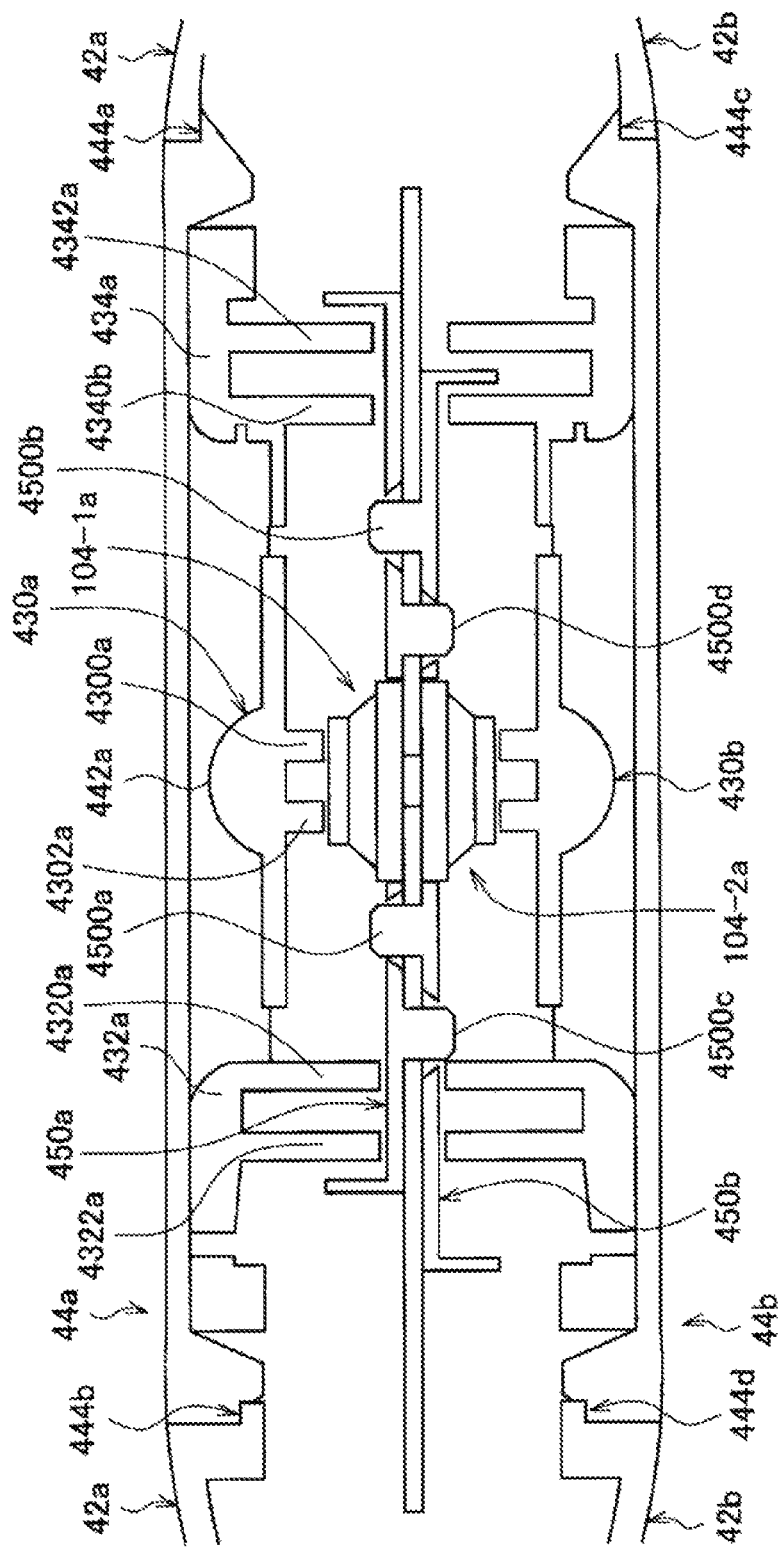
FIG. 12 is a view schematically depicting a cross section of the chassis 40 taken along line D-D depicted in FIG. 3B.

As depicted in FIG. 11 and FIG. 12, for example, a rubber key 450*a* or a rubber key 450*b* may be disposed on the respective sides of two directions perpendicular to the extension direction of the chassis 40 in directions opposite to each other. For example, as depicted in FIG. 12, the rubber key 450 may include at least one boss 4500, and the at least one boss 4500 may be each lightly press-fitted into a hole provided in the substrate 500. As a result, the rubber key 450 may be reliably fixed to the substrate 500.

In addition, one of the interior operation button 104-1 or the interior operation button 104-2 may be disposed in each of the individual rubber keys 450. In addition, the interior operation button 104-2 may be disposed at a position substantially symmetrical to the interior operation button 104-1 with respect to the substrate 500 (more accurately, with respect to a surface which is parallel to the extension direction of the chassis 40, and passes through the center of the cross section of the chassis 40 along the circumferential direction of the chassis 40).

In addition, as depicted in FIG. 11, a resin key 430 which is deformable (operable) only with respect to one direction perpendicular to the extension direction of the chassis 40 may be disposed inside the chassis 40. This "resin key 430" is a portion, having a key structure, which is molded by ejecting a resin into a cavity for an injection mold, and may be regarded as being integrally molded with the chassis 40. It should be noted that, in an initial state (specifically, in a state in which no force is applied from the outside), the resin key 430 may be disposed so as not to contact the rubber key 450. In addition, as depicted in FIG. 11, of the resin key 430, a key top 442 as a surface closest to the rubber surface 44 may be configured in a dome shape. It should be noted that the key top 442 may be fixed to the rubber surface 44, or may be separated away from the rubber surface 44.

In addition, as depicted in FIG. 12, in both sides of the resin key 430 (along the extension direction of the chassis 40), a rubber key fixing section 432 and a rubber key fixing section 434 may be fixed to the rubber surface 44. In the initial state (specifically, in the state in which no force is applied from the outside), the rubber key fixing section 432 is arranged in such a way that a distance between a lower end portion 4320 and a lower end portion 4322 of the rubber key fixing section 432, and the rubber key 450*a* becomes shorter than a predetermined distance. It should be noted that this also applies to the rubber key fixing section 434. As a result, it is possible to prevent the rubber key 450*a* from floating by a predetermined distance or more, more specifically, prevent the rubber key 450*a* from moving toward the rubber surface 44*a* by a predetermined distance or more.

Action

According to the configuration described above, for example, as depicted in FIG. 11, when the circumference of the position on the rubber surface 44 corresponding to the disposition position of the interior operation button 104-1 is depressed by the user, the depressing force is transmitted to the resin key 430*a*, so that the resin key 430*a* moves toward the rubber key 450*a*. As a result, either the lower end portions 4300*a* or the lower end portions 4300*b* of the resin key 430*a* moves up to the interior operation button 104-1, thereby enabling the interior operation button 104-1 to be depressed. Thereafter, for example, when the user releases his/her hand from the rubber surface 44, the resin key 430*a* can move in a direction opposite to the depressing direction to return to the initial position.

In addition, as described above, the key top 442*a* may be configured in the dome shape. As a result, for example, as depicted in FIG. 11, not only in a case where the user depresses the rubber surface 44*a* from directly above the interior operation button 104-1, but also in a case where the user depresses the rubber surface 44*a* from an oblique direction of the interior operation button 104-1, the depressing force may be reliably transmitted to the resin key 430*a*. More specifically, since a range in which the interior operation button 104-1 can be depressed has a given spread in the rubber surface 44, the user can more easily depress the interior operation button 104-1.

{2-1-3. Functional Configuration}

Figure 13:
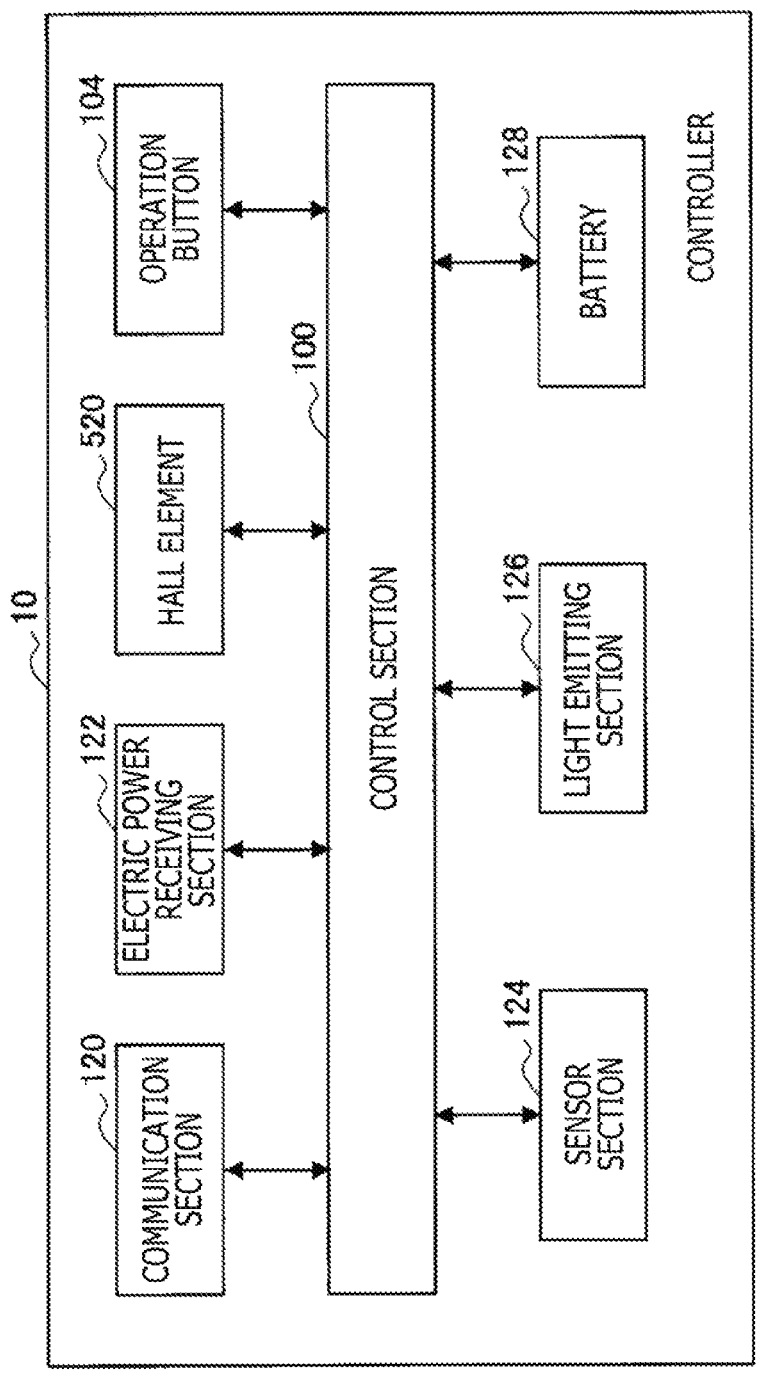
FIG. 13 is a block diagram depicting an example of a functional configuration of the controller 10.

The interior configuration of the chassis 40 has been described so far. Next, a functional configuration of the controller 10 will be described in detail. FIG. 13 is a block diagram depicting an example of a functional configuration of the controller 10. As depicted in FIG. 13, the controller 10 has a control section 100, a communication section 120, an electric power receiving section 122, a hall element 520, an operation button 104, a sensor section 124, a light emitting section 126, and a battery 128. Here, the operation button 104 is a general term of the interior operation button 104-1, the interior operation button 104-2, and the exterior operation button 104-3. It should be noted that, in the following, the description of the contents overlapping the above description will be omitted.

(2-1-3-1. Control Section 100)

The control section 100, for example, may include a processing circuit such as a central processing unit (CPU). The control section 100 generally controls the operation of the controller 10.

For example, the control section 100 controls the transmission of signals to the control apparatus 20. As an example, the control section 100 causes the communication section 120 to transmit a signal representing an amount of operation of the jog dial 102 detected by the hall element 520, and a signal representing a detection result of the operation for the operation button 104 to the control apparatus 20.

In addition, the control section 100 controls the light emission of the light emitting section 126 on the basis of a signal received from an external apparatus (for example, the control apparatus 20 or the like). In addition, in a case where an electric power is received from the external apparatus by the electric power receiving section 122 which will be described later, the control section 100 supplies the electric power thus received to the battery 128.

(2-1-3-2. Communication Section 120)

The communication section 120 is an example of a reception section in the present disclosure. The communication section 120, for example, performs transmission/reception of information to/from other apparatus through a wireless communication or wired communication complying with Bluetooth (registered trademark) low energy (BLE) or the like. For example, the communication section 120 transmits the signal representing the detection result of the operation for the jog dial 102 or the operation button 104 to the control apparatus 20 in accordance with the control by the control section 100. In addition, the communication section 120 receives a control signal (for example, a control signal in accordance with which the light emitting section 126 is caused to emit light, or the like) responding to the contents of the operation for the jog dial 102 or the operation button 104 from the control apparatus 20.

(2-1-3-3. Electric Power Receiving Section 122)

The electric power receiving section 122 receives an electric power supplied from the external apparatus (for example, a cradle or the like) in a non-contact manner. For example, the electric power receiving section 122 may be a coil, and the electric power receiving section 122 may be wound within the chassis 40 along the extension direction of the chassis 40. It should be note that, since the chassis 40 has the ring type in shape as described above, the wound coil can be easily arranged within the chassis 40. Therefore, an installation space of the electric power receiving section 122 can be reduced as much as possible.

(2-1-3-4. Sensor Section 124)

The sensor section 124 is an example of a first sensor section in the present disclosure. The sensor section 124, for example, may include a three-axis acceleration sensor, a gyro sensor, or the like. The sensor section 124 may sense a motion, a posture, and the like of the controller 10.

It should be noted that functions associated with the individual interior operation buttons 104-1 and/or the individual exterior operation button 104-3 may be changed in response to a sensing result by the sensor section 124 (for example, a sensing result of a motion of the controller 10, or the like) by the control apparatus 20, for example.

(2-1-3-5. Battery 128)

The battery 128, for example, may be a secondary battery such as a lithium-ion secondary battery. The battery 128, for example, stores the electric power received by the electric power receiving section 122 in accordance with the control by the control section 100 (wireless charging). It should be note that, as a modified example, the battery 128 may also be a primary battery such as a dry-cell battery.

It should be noted that the functions of other constituent elements are substantially similar to those described above.

(2-1-3-6. Pairing)

Figure 14:
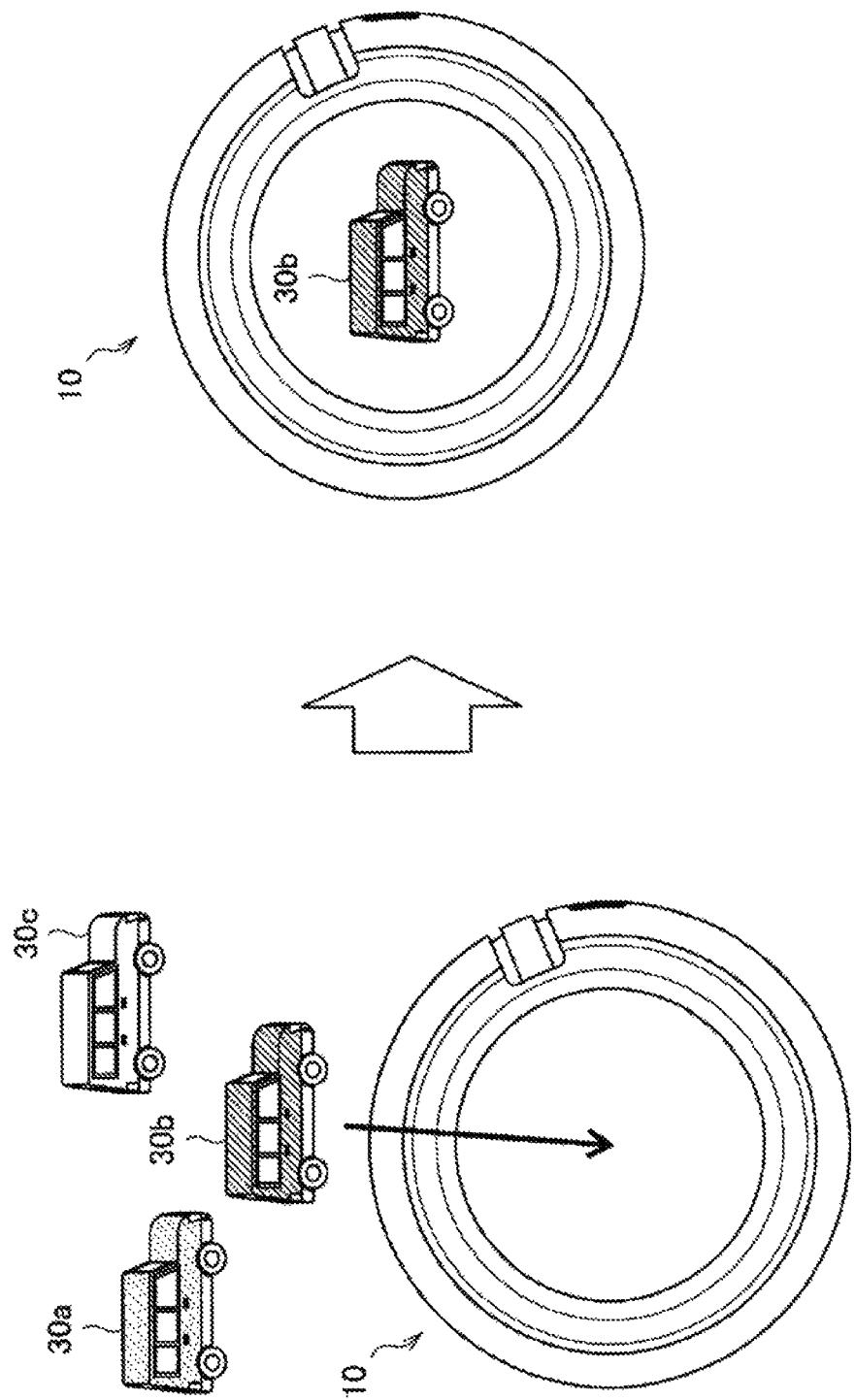
FIG. 14 is a view depicting an example of a method of pairing the controller 10 and an object 30 with each other.

It should be noted that, as described above, the object 30 as the operation target of the controller 10, and the controller 10 may be paired with each other. Here, a specific method of pairing the controller 10 and the object 30 will be described. For example, the pairing of the individual controllers 10, and the individual objects 30 may be previously set, or, for example, the pairing may be able to be specified at an arbitrary timing by the user. In the latter case, for example, as depicted in FIG. 14, the object 30 desired to be paired with the controller 10 is arranged at the center of the controller 10 (specifically, in the opening more inward than the inner circumference of the chassis 40), thereby enabling the pairing to be established by, for example, using the following two kinds of methods.

Here, a first method is a method of establishing the pairing on the basis of a value of received signal strength indication (RSSI) of a signal which the controller 10 receives from the object 30. Specifically, first, the sensor section 124 of the controller 10 measures the value of RSSI of the signal received from the object 30 arranged at the center of the controller 10. Then, the control section 100 causes the communication section 120 to transmit the measured value of RSSI to the control apparatus 20. Thereafter, the control apparatus 20 compares the received value of RSSI with a predetermined threshold value. Then, only in a case where the value of RSSI is equal to or larger than the predetermined threshold value, the control apparatus 20 pairs the controller 10 and the object 30 with each other.

In addition, a second method is a method of establishing the pairing by near field radio communication (NFC) between the controller 10 and the object 30. Specifically, a tag of NFC may be disposed in the object 30. Then, only in a case where the communication is established between the controller 10 (of the communication section 120) and the object 30 through NFC, the controller 10 and the object 30 may be paired with each other.

2-2. Effects

{2-2-1. Effect 1}

As has been described so far, the controller 10 according to the present embodiment may have the ring type chassis 40. For this reason, for example, the four kinds of operation methods depicted in FIG. 2 can be all realized. For example, in a scene in which the user horizontally holds the controller 10, the case where the user operates the controller 10 with the right hand, and the case where the user operates the controller 10 with the left hand are substantially identical to each other in operability.

{2-2-2. Effect 2}

In addition, the jog dial 102 which the controller 10 has is slidable along the extension direction of the chassis 40 with a predetermined position as a reference, and is rotatable in the circumferential direction of the chassis 40 with the predetermined position as the reference. For this reason, even in a case where the user holds the controller 10 with an arbitrary way of holding, for example, with one hand or both hands, the user can easily operate the jog dial 102.

In addition, the jog dial 102 may be disposed in the circumferential direction of the chassis 40. For this reason, for example, even when the user changes the way he/she holds the controller 10, the case where the user operates the jog dial 102 with the right hand, and the case where the user operates the jog dial 102 with the left hand are substantially identical to each other in operability.

3. MODIFIED EXAMPLES

Although the preferred embodiment of the present disclosure has been described in detail so far with reference to the accompanying drawings, the present disclosure is by no means limited to such an example. It is obvious that a person skilled in the art in a technical field to which the present disclosure pertains can conceive various kinds of changes or modifications within the scope of the technical idea described in CLAIMS, and those are naturally acknowledged as pertaining to the technical scope of the present disclosure. For example, the configuration with which at least a part of the problems to be solved by the embodiment described above can be solved may be understood (as a modified example of the present disclosure) as pertaining to the technical scope of the present disclosure.

3-1. Modified Example 1

For example, although the example in which the rubber surface 44 is fixed to the chassis 40 has been mainly described in the embodiment described above, the present disclosure is by no means limited to such an example, and the rubber surface 44 may be detachable. In addition, in this case, instead of the (standard) rubber surface 44, another kind of rubber surface 46 may be attachable to the chassis 40.

Figure 15A:
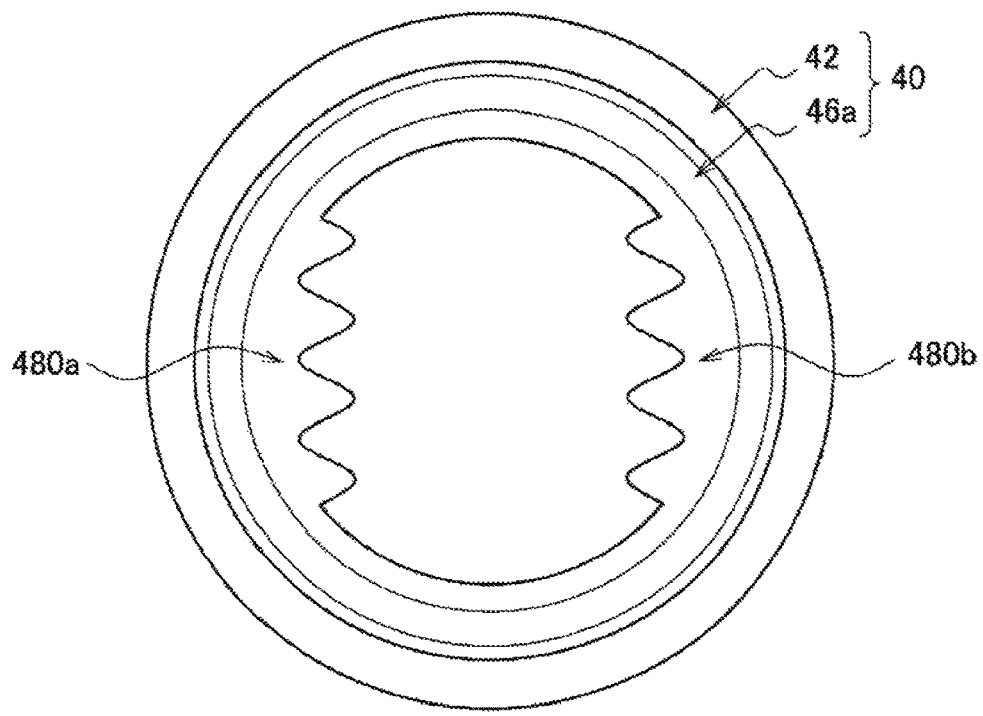
FIG. 15A is a depicting an example in which a rubber surface 46a having two grip regions 480 is mounted to the chassis 40.

For example, as depicted in FIG. 15A, the rubber surface 46a having two grip regions 480 on the inner circumferential side may be mounted to the chassis 40 (instead of the standard rubber surface 44). As a result, the ease to hold the controller 10 may be enhanced.

Figure 15B:
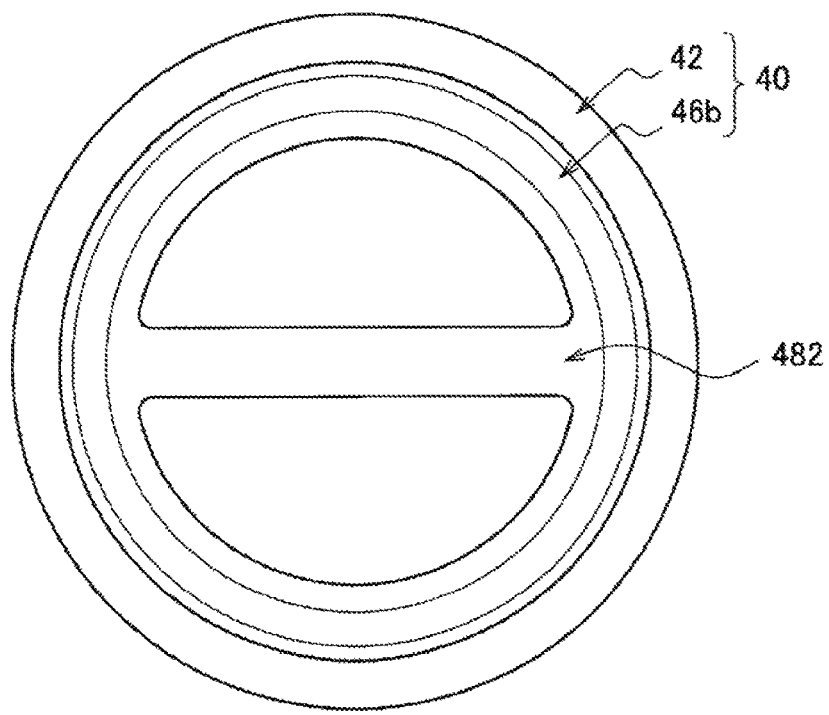
FIG. 15B is a depicting an example in which a rubber surface 46b having a grip section 482 at a center thereof is mounted to the chassis 40.

Alternatively, as depicted in FIG. 15B, for example, a rubber surface 46b having a cylindrical grip section 482 at the center may be mounted to the chassis 40 (instead of the standard rubber surface 44). As a result, the user can grip not only the chassis 40 in the circumferential direction, but also the grip section 482. For example, the user holds the grip section 482, whereby the user becomes easy to thrust the controller 10 in front of the user like boxing, or pull back the controller 10.

Figure 15C:
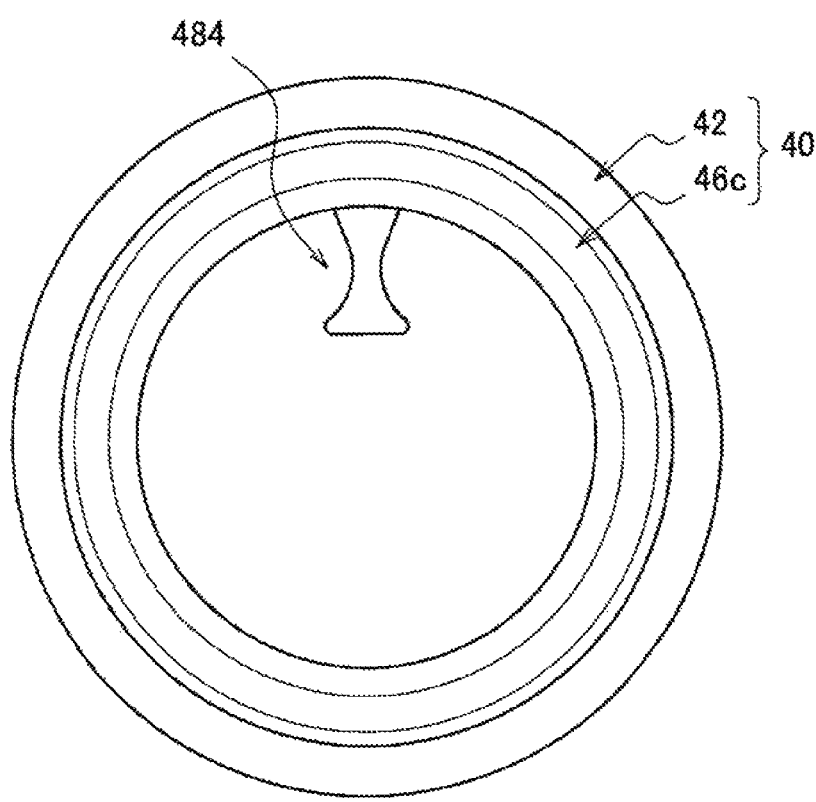
FIG. 15C is a view depicting an example in which a rubber surface 46c having a trigger 484 is mounted to the chassis 40.

Alternatively, as depicted in FIG. 15C, a rubber surface 46c having a trigger 484 on the inner circumferential side may be mounted to the chassis 40 (instead of the standard rubber surface 44). For example, the rubber surface 46c may be mounted to the chassis 40 in such a way that the user can depress the exterior operation button 104-3b by operating the trigger 484. As a result, the user can operate the exterior operation button 104-3b by pulling the trigger 484.

3-2. Modified Example 2

In addition, as another modified example, a plurality of light emitting sections 126 each emitting visible light or infrared light may be disposed in the controller 10. Then, for example, the control apparatus 20 recognizes a position of the light emitting section 126 at the time of photographing on the basis of an image of the controller 10 captured by a camera (illustration is omitted) disposed within the environment, thereby enabling the position or posture of the controller 10 to be also recognized. As a result, for example, even in an arbitrary kind of game machines, a virtual reality (VR) application, an augmented reality (AR) application, or the like, the operation using the controller 10 according to the present embodiment becomes possible. It should be noted that a camera provided in a head mounted display (HMD) may be utilized as the camera disposed in the environment. In this case, the control apparatus 20 may be configured integrally with the HMD, and the controller 10 is preferably connected to the HMD in a wireless manner.

3-3. Modified Example 3

In addition, as another modified example, a plurality of buttons (or pressure sensors) corresponding to the fingers may be disposed at respective positions, on the external surface of the chassis 40, corresponding to the respective positions of the fingers of the user, when the user grasps the controller 10. In this case, for example, in a scene in which a virtual hand is displayed on an external display which can be communicated with the control apparatus 20, the control apparatus 20 may be able to change a gesture of the virtual hand on the basis of a result of detection of a touch operation of the user for each of the plurality of buttons (or pressure sensors).

3-4. Modified Example 4

It should be noted that, since the posture of the controller 10 is constrained in a case where the control apparatus 20 and the controller 10 are connected to each other through the cable 22, the user can recognize the upper and lower directions (specifically, which side is "upper") of the controller 10. On the other hand, in a case where the control apparatus 20 and the controller 10 are not connected to each other through the cable 22, it is feared that the user does not distinguish the upper and lower sides of the controller 10. Then, as another modified example, a logo may be printed in a predetermined position (for example, in the exterior operation button 104-3a or the like) of the external surface of the chassis 40. As a result, even in a case where the control apparatus 20 and the controller 10 are not connected to each other through the cable 22, it is possible to cause the user to recognize the upper and lower directions. Then, the user can be guided so as to prevent the user from holding the controller 10 upside down.

In addition, two interior operation buttons 104-1 (and two interior operation buttons 104-2) which are located symmetrical with respect to the vertical direction of the controller 10 may be all associated with the same function. As a result, even in a case where the user holds the controller 10 upside down, the user can operate the controller 10 similarly to the case where the user holds properly the controller 10 with respect to the vertical direction.

3-5. Modified Example 5

In addition, as another modified example, the controller 10, for example, may be a wearable device such as a ring type device, a bracelet type device, or a wrist-watch type device. Here, each of the ring type device, and the bracelet type device needs not to have a perfect circular shape, and has only to have a shape through which the finger or arm of the user can be inserted. It should be noted that, as described above, at least a part of the jog dial 102 may be fitted into the recess section 422 of the chassis 40, and the amount of protrusion from the recess section 422 of the jog dial 102 may be substantially identical to a depth of the recess section 422 from the external surface of the chassis 40. Therefore, the entire surface of the chassis 40 becomes substantially continuous, and no protrusion is generated. For this reason, in the case where the controller 10 is utilized as the wearable device, the sense of wearing is excellent, and the user can easily operate the jog dial 102 or the like, for example. In addition, since the probability that the controller 10 as the wearable device accidentally drops is essentially small, the controller 10 as the wearable device may be suitably used as a controller for a gesture input or a controller for VR as well.

3-6. Combination of Modified Examples 2, 3, and 5

In addition, as described above, the controller 10 as the wearable device of modified example 5 can be suitably applied to the VR application described in modified example 2 described above. Since it may be impossible for the user to directly visually recognize the real environment at the time of utilization of the VR application, when the user drops the controller 10 in the real space, he/she is difficult to pick up the dropped controller 10. For such a problem, since the probability of the drop of the controller 10 is essentially small in the controller 10 as the wearable device, mounting of a strap or the like for fall prevention can be omitted. Incidentally, from a viewpoint of the operability as the controller for VR, the controller 10 as the wearable device is preferably configured in the form of the ring type device. By adopting such a configuration in the VR application, the user can also perform the more detailed input operation by the jog dial 102 while the natural gesture input (modified example 3) and the fall prevention for the controller 10 (modified example 5) are both achieved. In addition, the controller 10 as the ring type device does not change in operability thereof irrespective of the right-handed person or the left-handed person. Therefore, the control apparatus 20 is caused to recognize the controller 10 for the right hand, and the controller 10 for the left hand, resulting in that the user can perform independent operation input with each of the jog dial 102 for the right hand and the jog dial 102 for the left hand.

In addition, when the pressure sensor of modified example 3 is applied to the controller 10 as the ring type device, even if the number of the controller 10 to be mounted is one, a plurality of kinds of hand gestures (signs) can be inputted. For example, in a case where the user mounts the controller 10 to an index finger, for contact between the pressure sensor on the upper portion of the controller 10, and a thumb, a pinch gesture may be displayed on the display. In addition, for contact between the pressure sensor on the lower portion of the controller 10 and a middle finger, a thumbs up gesture may be displayed on the display. In addition, for simultaneous contact of the thumb and the middle finger with the pressure sensor on the upper portion of the controller 10 and the pressure sensor on the lower portion of the controller 10, the grab gesture may be displayed on the display. In such a manner, by providing the pressure sensors on the upper and lower sides of the controller 10, at least three kinds of hand gesture inputs can be displayed in conformity with the hand gesture operation in the real space. It is a matter of course that the hand gesture described above may be replaced with other operation inputs. In addition, the pressure sensors may be replaced with sensors each capable of detecting the contact of other fingers, or may be replaced with the buttons as described above. In addition, it is only sufficient that the pressure sensor is provided on at least one of the upper portion or the lower portion of the controller 10.

In the ring type device, the side opposite to the jog dial 102 is located in the position where the fingers of the user substantially do not contact. For this reason, a power source switch of the controller 10 is preferably provided on the exterior circumferential surface of the controller 10 on the side opposite to the jog dial 102. In addition, in a case where the pressure sensors are provided on the upper side and the lower side of the controller 10 and the hand gesture is performed as described above, the jog dial 102 is inevitably to be arranged between the pressure sensors. In this configuration, first, arrangement of the pressure sensors is defined at respective positions where the thumb and the middle finger contact, and then, a size of the jog dial 102 is defined depending on a size of a space defined between the pressure sensors.

In addition, the effects described in the present specification are merely explanatory or exemplary, and are not limitative. In other words, the technology according to the present disclosure can offer other effects obvious to a person skilled in the art from the description of the present specification together with the effect described above, or instead of the effects described above.

It should be noted that the following configurations also pertain to the technical scope of the present disclosure.

(1) A controller including:

a chassis; and an operation member which is slidable along an extension direction of the chassis with a predetermined position as a reference, is rotatable in a circumferential direction of the chassis with the predetermined position as the reference, and at least a part of which is fitted to a recess section provided in an external surface of the chassis.

(2) The controller according to (1) describe above, further including:

an elastic member configured so as to give an elastic force directed toward the predetermined position to the operation member in a case where the operation member moves from the predetermined position.

(3) The controller according to (2) described above,
in which the elastic member includes a first elastic structure which is configured so as to be elastically deformed in the extension direction, and a second elastic structure which is configured so as to be elastically deformed in the circumferential direction.

(4) The controller according to (3) described above,
in which the elastic member is an integrally molded compression spring including the first elastic structure and the second elastic structure.

(5) The controller according to (3) or (4) described above,
in which the second elastic structure includes a first elastic member which gives an elastic force directed toward a first direction in the circumferential direction to the operation member, and a second elastic member which gives an elastic force directed toward a second direction opposite to the first direction in the circumferential direction to the operation member.

(6) The controller according to any one of (1) to (5) described above,
in which the chassis is a ring type in shape.

(7) The controller according to (6) described above, further including:
a first operation button which is disposed within the chassis, and which receives an operation on a basis of depressing of an external surface of the chassis; and
a second button which is disposed at a position substantially symmetrical to the first operation button with a predetermined surface within the chassis as a reference, and which receives an operation on the basis of the depressing of the external surface of the chassis,
in which the predetermined surface is a surface which is parallel to the extension direction, and passes through substantially a center of a cross section of the chassis along the circumferential direction.

(8) The controller according to (7) described above,
in which the controller has a plurality of the first operation buttons and a plurality of the operation buttons,
each of the plurality of first operation buttons corresponds to any one of the plurality of second operation buttons on a one-to-one basis, and
each of the plurality of second operation buttons, and the first operation button corresponding to the second operation button of interest of the plurality of first operation buttons are disposed at positions substantially symmetrical to each other with the predetermined surface as the reference.

(9) The controller according to (7) or (8) described above, further including:
a first sensor section sensing a motion of the controller,
in which a function associated with the first operation button and/or the second operation button is changed in response to a sensing result by the first sensor section.

(10) The controller according to any one of (7) to (9) described above,
in which an external surface of the chassis includes:
a first surface arranged on an external circumferential side of the first chassis, and made of a material harder than a rubber; and
a second surface arranged on an internal circumferential side of the chassis, and made of the rubber.

(11) The controller according to (10) described above,
in which, in a case where the controller is placed on a surface of other object, the second surface contacts the surface of the other object.

(12) The controller according to (10) or (11) described above,
in which the first operation button and the second operation button are individually arranged in regions within the chassis corresponding to the second surface, and
the first operation button and the second operation button each receive an operation on a basis of depressing of the second surface.

(13) The controller according to any one of (10) to (12) described above,
in which the first surface and the second surface have substantially symmetrical shapes with the predetermine surface as the reference.

(14) The controller according to any one of (6) to (13) described above,
in which an amount of protrusion from the recess section of the operation member is substantially identical to a depth of the recess section from the external surface of the chassis.

(15) The controller according to any one of (6) to (14) described above,
in which an external surface of the operation member has a shape which is substantially symmetrical with a predetermined surface within the chassis as the reference, and
the predetermined surface is a surface which is parallel to the extension direction, and passes substantially a center of a cross section of the chassis along the circumferential direction.

(16) The controller according to any one of (1) to (15) described above, further including:
a second sensor section sensing an amount of sliding of the operation member along the extension direction, and an amount of rotation of the operation member in the circumferential direction.

(17) The controller according to (16) described above,
in which the operation member further has a magnet, and
the second sensor section senses the amount of sliding of the operation member and the amount of rotation of the operation member by sensing a density of a magnetic flux of surroundings of the second sensor section.

(18) The controller according to any one of (1) to (17) described above, further including:
a support shaft provided within the chassis,
in which the operation member has a fitting hole, and
the support shaft is inserted through the fitting hole.

(19) The controller according to any one of (1) to (18) described above, further including:
a reception section receiving a signal responding to an operation for the operation member from an external apparatus;
a light emitting section; and
a control section causing the light emitting section to emit light on a basis of the received signal.

(20) The controller according to any one of (1) to (19) described above, further including:
an electric power receiving section which is wound inside the chassis along the extension direction, and receives an electric power supplied from an external apparatus in a non-contact manner; and a battery storing the electric power received from the electric power receiving section.

REFERENCE SIGNS LIST 10, 90a, 90b Controller
20 Control apparatus
30 Object
40 Chassis
42 Resin surface
44, 46 Rubber surface
100 Control section 102 Jog dial
104-1, 104-2 Interior operation button
104-3 Exterior operation button
120 Communication section
122 Electric power receiving section
124 Sensor section
126 Light emitting section
128 Battery
422 Recess section
430 Resin key
450 Rubber key
500 Substrate
504 Support shaft
520 Hall element
600 Elastic member
1024 Fitting hole
1040 Magnet
6000 Compression spring
6002 Elastic structure

The invention claimed is:

1. A controller comprising:
a chassis having an at least partial annular, ring type shape, defining an annular axis extending in an extension direction, and defining a circumferential axis extending in a circumferential direction about the annular axis; and
an operation member which is: (i) slidable along the extension direction of the chassis with a predetermined position as a reference, and (ii) is rotatable in the circumferential direction of the chassis with the predetermined position as the reference, where at least a part of the operation member is fitted into a recess section provided in an external surface of the chassis.

2. The controller according to claim 1, further comprising: an elastic member configured so as to give an elastic force directed toward the predetermined position to the operation member in a case where the operation member moves from the predetermined position.

3. The controller according to claim 2, wherein the elastic member includes a first elastic structure which is configured so as to be elastically deformed in the extension direction, and a second elastic structure which is configured so as to be elastically deformed in the circumferential direction.

4. The controller according to claim 3, wherein the elastic member is an integrally molded compression spring including the first elastic structure and the second elastic structure.

5. The controller according to claim 3, wherein the second elastic structure includes a first elastic member which gives an elastic force directed toward a first direction in the circumferential direction to the operation member, and a second elastic member which gives an elastic force directed toward a second direction opposite to the first direction in the circumferential direction to the operation member.

6. The controller according to claim 1, further comprising:
a first operation button which is disposed within the chassis, and which receives an operation on a basis of depressing of an external surface of the chassis; and
a second button which is disposed at a position substantially symmetrical to the first operation button with a predetermined surface within the chassis as a reference, and which receives an operation on the basis of the depressing of the external surface of the chassis,
wherein the predetermined surface is a surface which is parallel to the extension direction, and passes through a substantially center of a cross section of the chassis along the circumferential direction.

7. The controller according to claim 6, wherein
the controller has a plurality of the first operation buttons and a plurality of the operation buttons,
each of the plurality of first operation buttons corresponds to any one of the plurality of second operation buttons on a one-to-one basis, and
each of the plurality of second operation buttons, and the first operation button corresponding to the second operation button of interest of the plurality of first operation buttons are disposed at positions substantially symmetrical to each other with the predetermined surface as the reference.

8. The controller according to claim 6, further comprising:
a first sensor section sensing a motion of the controller,
wherein a function associated with the first operation button and/or the second operation button is changed in response to a sensing result by the first sensor section.

9. The controller according to claim 6, wherein an external surface of the chassis includes:
a first surface arranged on an external circumferential side of the first chassis, and made of a material harder than a rubber; and
a second surface arranged on an internal circumferential side of the chassis, and made of the rubber.

10. The controller according to claim 9, wherein, in a case where the controller is placed on a surface of other object, the second surface contacts the surface of the other object.

11. The controller according to claim 9, wherein
the first operation button and the second operation button are individually arranged in regions within the chassis corresponding to the second surface, and
the first operation button and the second operation button each receive an operation on a basis of depressing of the second surface.

12. The controller according to claim 9, wherein the first surface and the second surface have substantially symmetrical shapes with the predetermine surface as the reference.

13. The controller according to claim 1, wherein an amount of protrusion from the recess section of the operation member is substantially identical to a depth of the recess section from the external surface of the chassis.

14. The controller according to claim 1, wherein
an external surface of the operation member has a shape which is substantially symmetrical with a predetermined surface within the chassis as the reference, and
the predetermined surface is a surface which is parallel to the extension direction, and passes a substantially center of a cross section of the chassis along the circumferential direction.

15. The controller according to claim 1, further comprising: a second sensor section sensing an amount of sliding of the operation member along the extension direction, and an amount of rotation of the operation member in the circumferential direction.

16. The controller according to claim 15, wherein
the operation member further has a magnet, and
the second sensor section senses the amount of sliding of the operation member and the amount of rotation of the operation member by sensing a density of a magnetic flux of surroundings of the second sensor section.

17. The controller according to claim 1, further comprising:
a support shaft provided within the chassis,
wherein the operation member has a fitting hole, and
the support shaft is inserted through the fitting hole.

18. The controller according to claim 1, further comprising:
- a reception section receiving a signal responding to an operation for the operation member from an external apparatus;
- a light emitting section; and
- a control section causing the light emitting section to emit light on a basis of the received signal.

19. The controller according to claim 1, further comprising:
- an electric power receiving section which is wound inside the chassis along the extension direction, and receives an electric power supplied from an external apparatus in a non-contact manner; and
- a battery storing the electric power received from the electric power receiving section.

20. A controller comprising:
- a chassis;
- an operation member which is slidable along an extension direction of the chassis with a predetermined position as a reference, is rotatable in a circumferential direction of the chassis with the predetermined position as the reference, and at least a part of which is fitted into a recess section provided in an external surface of the chassis; and
- an elastic member configured so as to give an elastic force directed toward the predetermined position to the operation member in a case where the operation member moves from the predetermined position,
- wherein the elastic member includes a first elastic structure which is configured so as to be elastically deformed in the extension direction, and a second elastic structure which is configured so as to be elastically deformed in the circumferential direction.

* * * * *